(12) United States Patent
Hawkes

(10) Patent No.: US 11,057,249 B1
(45) Date of Patent: Jul. 6, 2021

(54) FRAME STRUCTURES, TRANSMITTERS, AND RECEIVERS UTILIZING DUAL SUBCARRIERS FOR SIGNAL ADJUSTMENT

(71) Applicant: Tarana Wireless, Inc., Santa Clara, CA (US)

(72) Inventor: Kelly Davidson Hawkes, Santa Clara, CA (US)

(73) Assignee: Tarana Wireless, Inc., Santa Clara, CA (US)

( * ) Notice: Subject to any disclaimer, the term of this patent is extended or adjusted under 35 U.S.C. 154(b) by 50 days.

(21) Appl. No.: 16/774,906

(22) Filed: Jan. 28, 2020

(51) Int. Cl.
| | |
|---|---|
| H04L 27/00 | (2006.01) |
| H04L 5/00 | (2006.01) |
| H04L 25/02 | (2006.01) |
| H04L 27/26 | (2006.01) |

(52) U.S. Cl.
CPC ........ H04L 27/0014 (2013.01); H04L 5/0007 (2013.01); H04L 5/0023 (2013.01); H04L 5/0046 (2013.01); H04L 5/0048 (2013.01); H04L 25/022 (2013.01); H04L 25/0204 (2013.01); H04L 25/0226 (2013.01); H04L 27/2613 (2013.01); H04L 27/2647 (2013.01); (Continued)

(58) Field of Classification Search
CPC ............. H04L 27/2657; H04L 27/0014; H04L 5/0023; H04L 5/0046; H04L 27/2675; H04L 5/0007; H04L 27/2613; H04L 25/0226; H04L 27/2605; H04L 25/0204; H04L 25/0224; H04L 27/2662; H04L 27/2695; H04L 27/2647; H04L 27/38
See application file for complete search history.

(56) References Cited

U.S. PATENT DOCUMENTS 8,948,285 B2 * 2/2015 Li ....................... H04L 25/0222
375/260
9,379,918 B1 * 6/2016 Milbar .................... H04L 27/22
(Continued)

*Primary Examiner* — Khanh C Tran
(74) *Attorney, Agent, or Firm* — Dorsey & Whitney LLP

(57) ABSTRACT

Examples of wireless OFDM communication systems are described herein which replace pilot subcarriers having known modulation with lower dual subcarriers. At the transmitter, for each resource block, the bits that modulate a few payload subcarriers are selected and then encoded with a short dual code thereby forming dual systematic bits and dual check bits. Such selected payload subcarriers are designated as upper dual subcarriers and the dual check bits modulate the lower dual subcarriers, At the receiver, for each resource block, the dual subcarriers are phase adjusted, demodulated, decoded using the short dual code, and re-modulated thereby forming the original dual subcarrier modulation without phase noise nor channel impairments. The re-modulated dual subcarriers are compared against the received dual subcarriers for channel estimation or carrier phase-locked-loop purposes. For example, prior-art OFDM systems with 4 pilots per resource block could be replaced with 8 dual subcarriers for a rate 1/2 short dual code. An increase in the number of subcarriers used for channel estimation or carrier phase-locked-loop tracking has less error in the channel estimate or phase estimate. Lower error permits lower payload BER, lower transmit power, or wider PLL bandwidth to track higher Doppler frequency shifts.

20 Claims, 12 Drawing Sheets

(52) U.S. Cl.
CPC ............... *H04L 2027/002* (2013.01); *H04L 2027/0042* (2013.01); *H04L 2027/0044* (2013.01)

(56) References Cited

U.S. PATENT DOCUMENTS

| | | | |
|---|---|---|---|
| 2005/0213678 A1* | 9/2005 | Lewis | H04L 27/266 375/260 |
| 2009/0175367 A1* | 7/2009 | Kishigami | H04L 27/2657 375/260 |
| 2010/0086013 A1* | 4/2010 | Pare, Jr. | H04L 25/0204 375/219 |
| 2015/0200797 A1* | 7/2015 | McCallister | H04L 27/2623 370/329 |
| 2017/0295049 A1* | 10/2017 | Sun | H04L 1/0042 |
| 2020/0084772 A1* | 3/2020 | Sekiya | H04L 1/1614 |

* cited by examiner

FRAME STRUCTURES, TRANSMITTERS, AND RECEIVERS UTILIZING DUAL SUBCARRIERS FOR SIGNAL ADJUSTMENT

TECHNICAL FIELD

Examples described herein relate generally to wireless communication technology. Examples of pilot signals and encoding schemes for phase and/or amplitude tracking are described.

BACKGROUND

Orthogonal frequency-division multiplexing (OFDM) generally refers to a method of digital signal modulation in which a single data stream (e.g., payload) is split across several separate narrowband subcarriers at different frequencies. In addition to payload subcarriers, a few pilot subcarriers are transmitted. Pilots may be used to track the changes in phase of the subcarriers between the transmitter and receiver (e.g., changes imposed by a wireless channel).

A phase-locked loop (PLL) may be used to track the phase difference between the transmitter and receiver for the subcarriers in a wireless OFDM receiver to overcome differences between the local oscillator's phase noise at the transmitter and at the receiver, and time varying changes in the propagation channel including phase changes due to Doppler. The PLL is updated for each OFDM symbol thereby attempting to track these changes.

Receivers may use pilot subcarriers embedded in the payload subcarriers to estimate the required amount of phase correction. The estimation of the amount phase correction may have some jitter due to phase noise at frequencies higher than the Nyquist frequency (e.g., one-half of the OFDM symbol rate), thermal noise of the receiver, and co-channel interference. To reduce and/or overcome the phase correction estimation error, the transmit power may be increased or the data rate may be decreased by selecting a modulation and coding scheme (MCS) with a lower code rate.

DETAILED DESCRIPTION

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Figure 1:
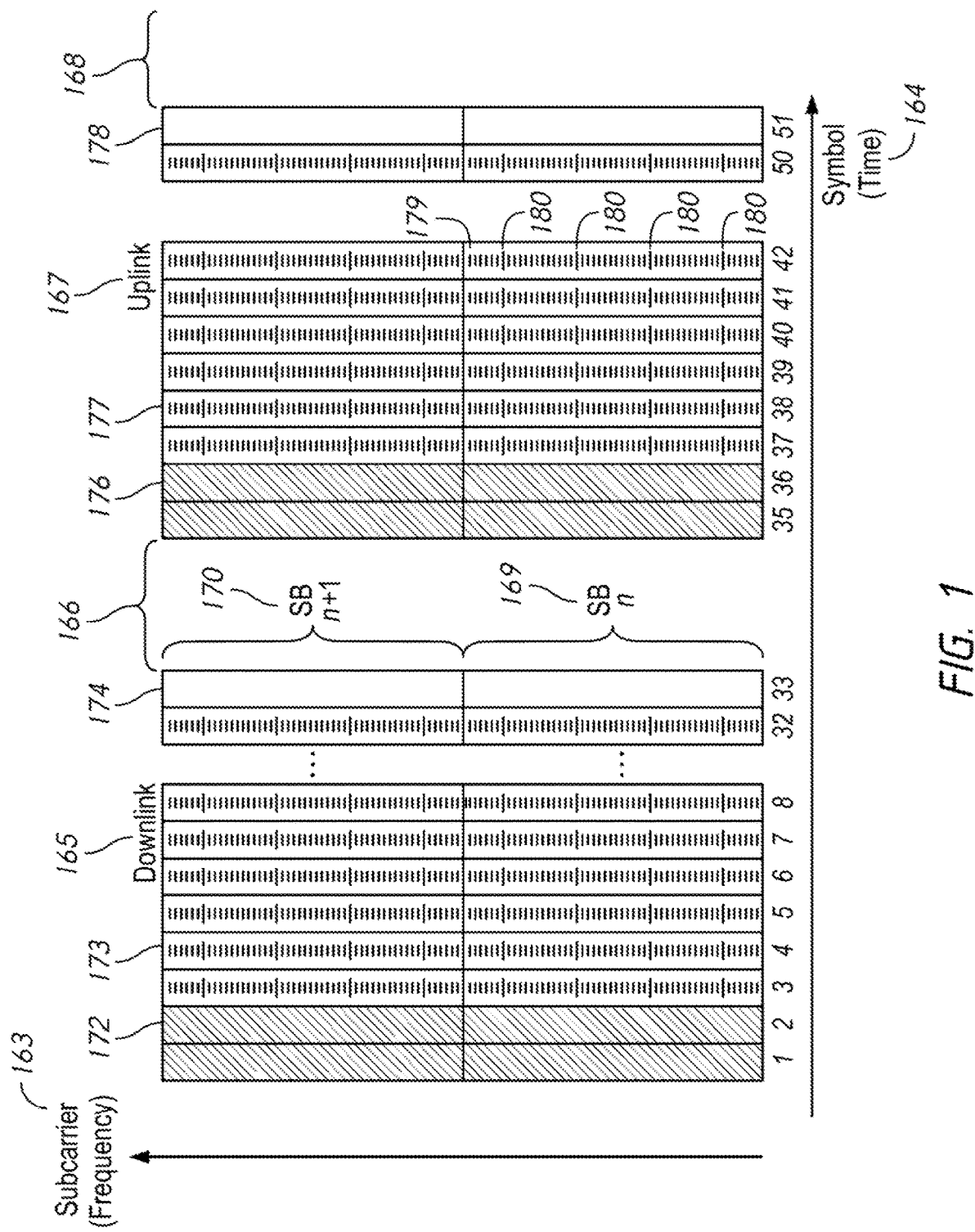
FIG. 1 is a schematic illustration of a general frame structure which may have drawbacks.

FIG. 1 is a schematic illustration of a general frame structure which may have drawbacks. The frame structure illustrate in FIG. 1 may be that of an OFDM communication link. It is represented as a two dimensional grid with subcarrier (frequency) 163 in the vertical direction and OFDM symbol (time) 164 in the horizontal direction. In a 5 ms frame, there may be a downlink subframe 165 including symbols 1 to 33 and an uplink subframe 167 including symbols 35 to 51. Each symbol may be approximately 97.1 us in duration including a 5.7 us cyclic prefix and 91.4 us of FFT data. The FFT duration may be 4096 points/44.8 MHz sample rate=91.4 us. Symbols 1 and 2 may be reference symbols 172 and may be used to train a downlink receive beamformer. Symbols 3 to 32 transport downlink payload and pilots 173. The downlink transmitter and receiver use symbol 33 for analog electronics calibration 174. There is a gap 166 between the downlink and uplink for the analog electronics to switch between transmit and receive and for the propagation delay through the channel; the gap usually being a non-integer number of symbols. Symbols 35 and 36 are reference symbols 176 that are used to train the uplink receive beamformer. Symbols 37 to 50 transport uplink payload and pilots 177. The uplink transmitter and receiver use symbol 51 for analog electronics calibration 178. There is a gap 168 between the uplink and downlink for the analog electronics to switch between transmit and receive and for the propagation delay through the channel; the gap usually being a non-integer number of symbols.

Each subband in FIG. 1 is 52 subcarriers tall and includes 48 payload subcarriers 179 and 4 pilot subcarriers 180. The subcarriers within a subband are distributed from low frequency to high frequency as follows: 6 payload, 1 pilot, 12 payload, 1 pilot, 12 payload, 1 pilot, 12 payload, 1 pilot subcarrier, and 6 payload. Only 2 of several subbands are shown in FIG. 1: subband n 169 and subband n+1 170.

Figure 2:
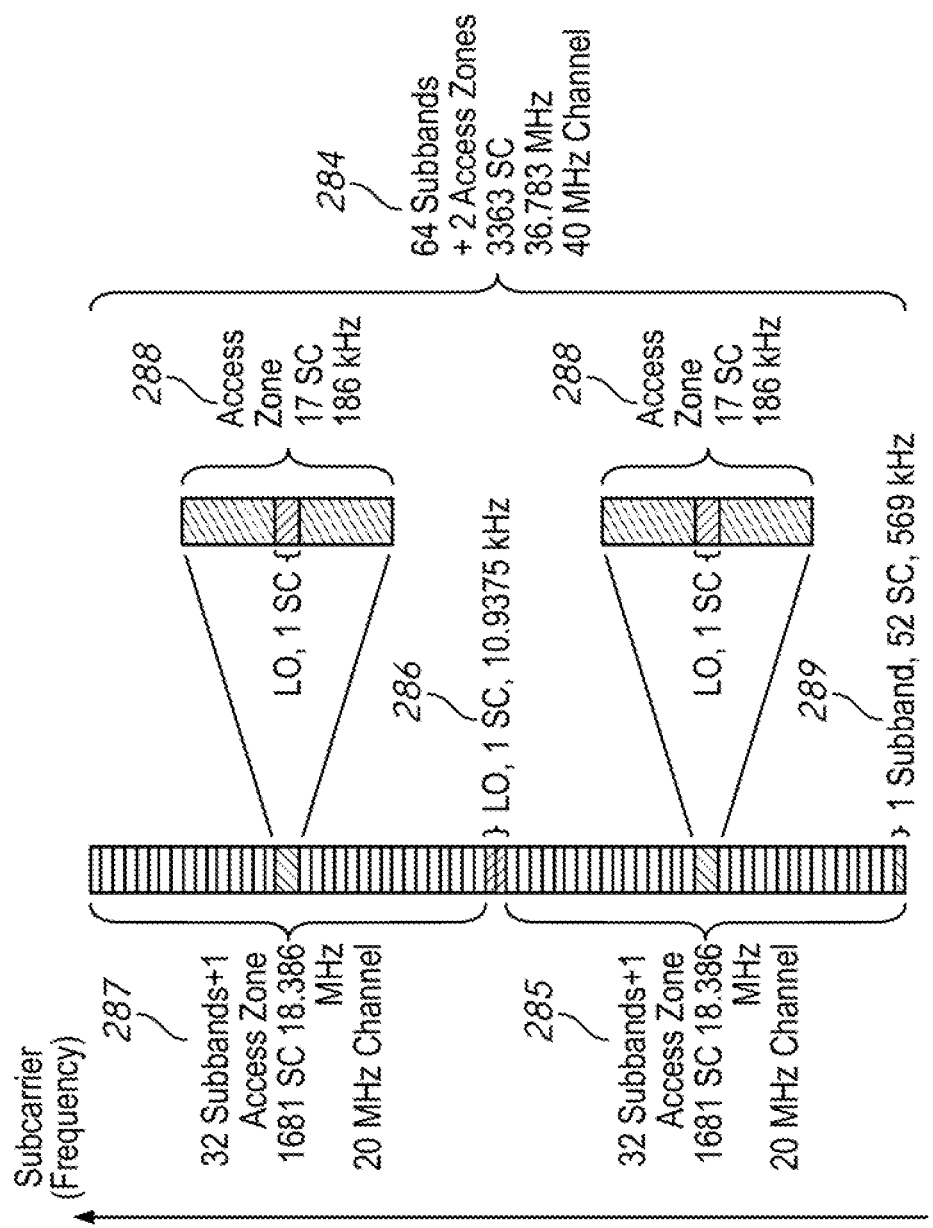
FIG. 2 is a schematic illustration of an OFDM signal as a function of frequency which may have drawbacks.

FIG. 2 is a schematic illustration of an OFDM signal as a function of frequency which may have drawbacks. A 40 MHz channel 284 includes 64 subbands plus 2 access zones for a total of 3363 subcarriers having a passband of 36.783 MHz. Each 40 MHz channel is decomposed into a lower 20 MHz channel 285, a subcarrier that is not used as it may be corrupted by unintentional local oscillator (LO) feedthrough 286, and an upper 20 MHz channel 287. Each 20 MHz channel includes 32 subbands and 1 access zone 288 for a total of 1681 subcarriers having a passband of 18.386 MHz. Each access zone 288 is 17 subcarriers tall (186 kHz) and includes 8 subcarriers, 1 reserved for LO feedthrough, and 8 more subcarriers. The non-LO subcarriers in the access zone carry PHY overhead information. Each subband 289 contains 52 subcarriers.

A communication link can be organized as 40-40 (e.g., one terminal has a 40 MHz bandwidth and the other terminal has a 40 MHz bandwidth), 40-2×20 (e.g., one 40 MHz terminal communicating with two 20 MHz terminals), or 20-20 (e.g., each terminal being 20 MHz in bandwidth).

Figure 3:
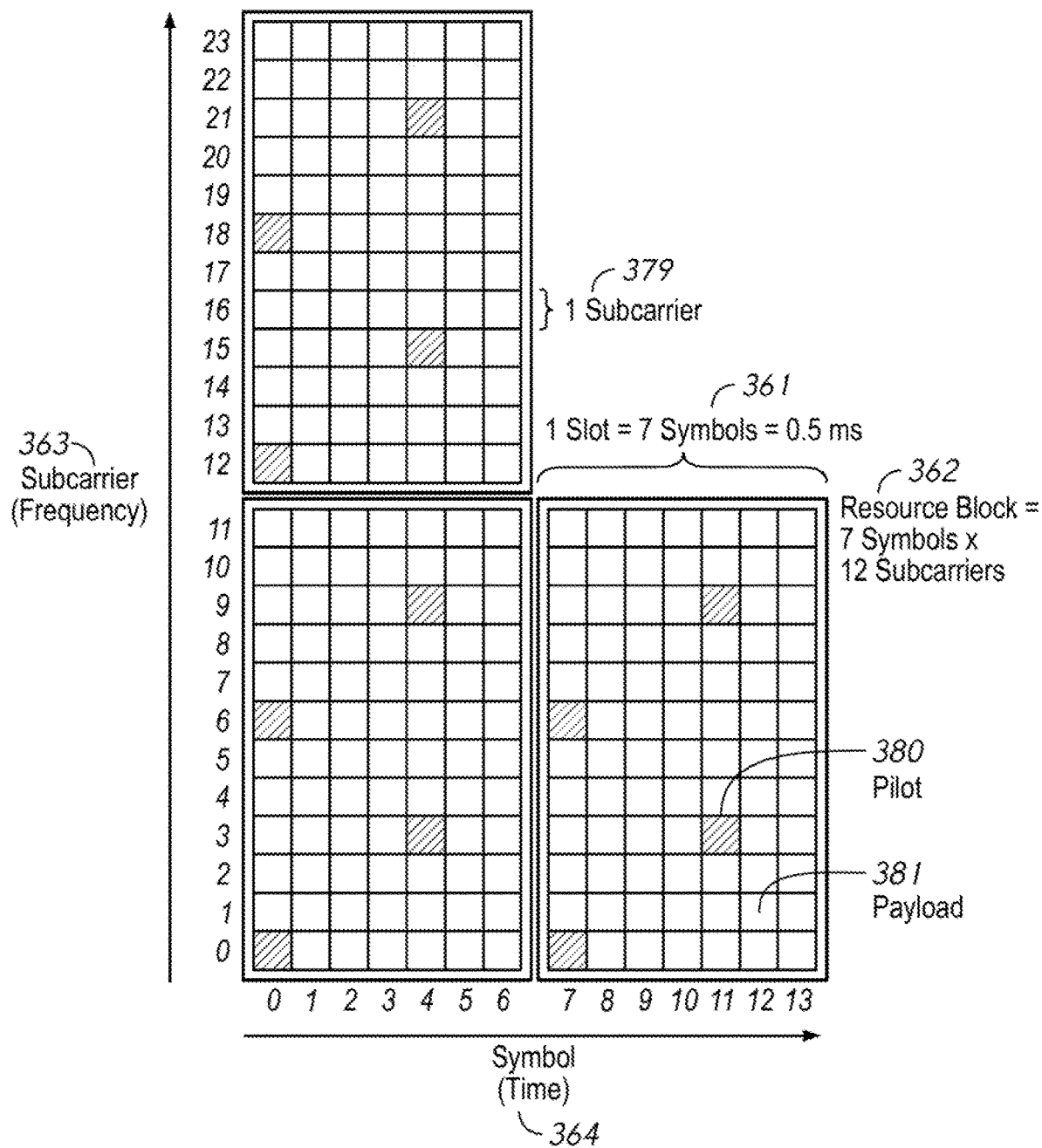
FIG. 3 is a schematic illustration of an LTE downlink which may have drawbacks.

FIG. 3 is a schematic illustration of an LTE downlink which may have drawbacks. The LTE downlink includes several resource blocks both in frequency and time. An LTE resource block 362 includes 7 OFDM symbols in time 364 by 12 subcarriers 379 in frequency 363 for a total of 84 subcarriers-symbols. A slot 361 is 7 OFDM symbols and has a duration of 0.5 ms. The subcarriers-symbols are divided into two categories: 80 payload 381 and 4 pilots 380. FIG. 3 shows location of pilots for the LTE SISO protocol. Examples of a "resource block" include a resource block for the LTE protocol as shown in FIG. 3 or a set of subcarriers 1 symbol wide by 52 subcarriers tall for the AA2 protocol as shown in FIG. 1.

In this manner, communication systems generally may use 4 pilots to estimate the amount of phase correction needed for each OFDM symbol. The variance of the estimation error is typically proportional to the reciprocal of the number of subcarriers used in the estimate. Compared to an ideal receiver that has perfect knowledge of the amount of needed phase correction, the transmit power of these general communication systems would have to be increased to overcome this jitter.

Examples of systems, methods, and frame structures described herein, however may utilize an increased number of subcarriers (such as a doubled number of subcarriers, e.g., relative to the 4 used in FIG. 1-FIG. 3) to estimate the amount of needed correction (e.g., phase correction). Examples described herein may utilize an increased number of subcarriers to generate an adjustment without increasing (or increasing less than expected) the total number of subcarriers in a subband. In this manner, a smaller increase in transmit power may be used to overcome and/or reduce estimation jitter compared to what would be used in the system of FIG. 1-FIG. 3.

Figure 4:
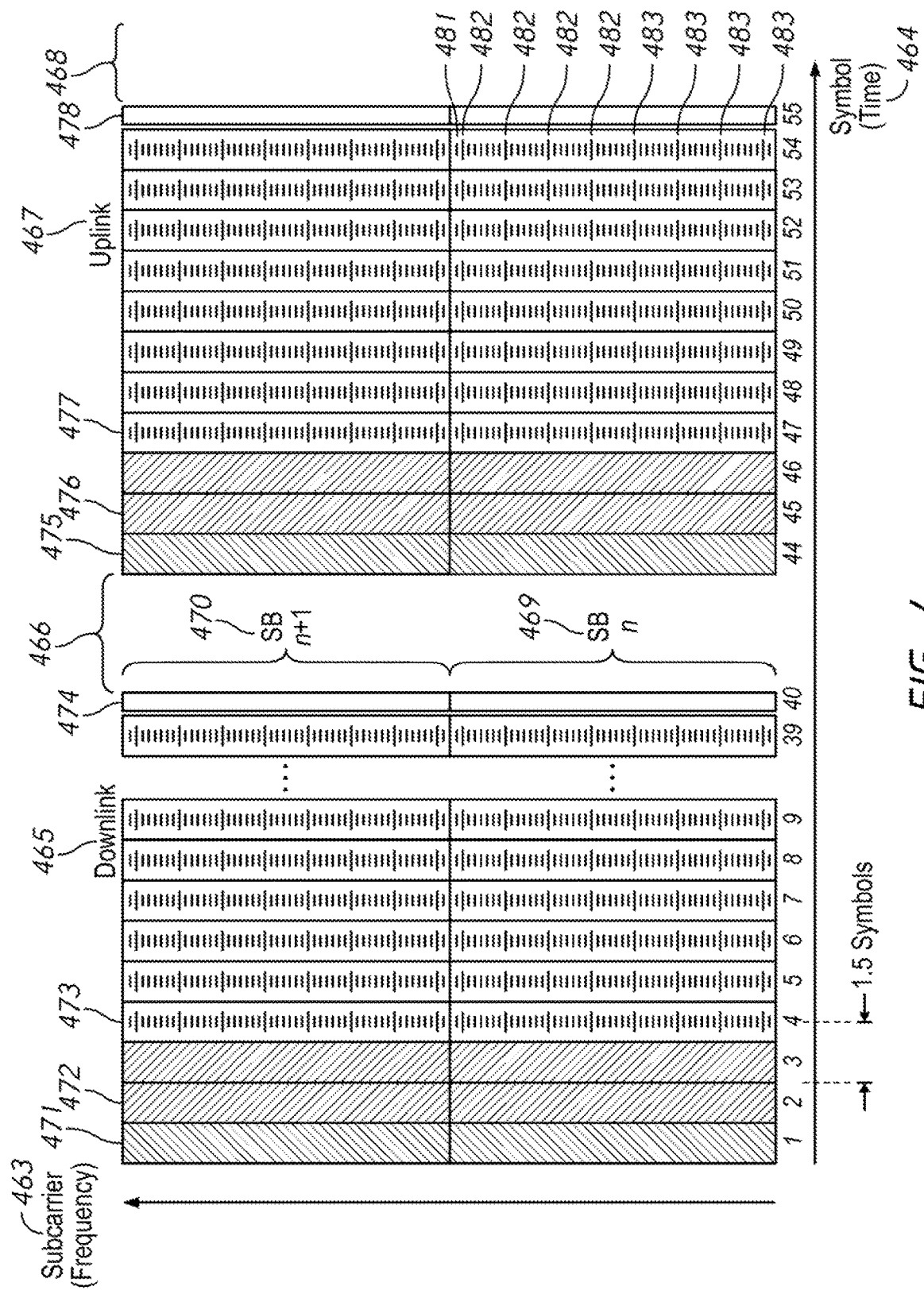
FIG. 4 is a schematic illustration of a frame structure for use with systems and methods described herein.

FIG. 4 is a schematic illustration of a frame structure for use with systems and methods described herein. In FIG. 4, the frame structure is represented as a two dimensional grid with subcarrier (e.g., frequency) 463 on a vertical axis and OFDM symbol (e.g., time) 464 on a horizontal axis. While OFDM symbols are shown, other modulation techniques may be used in other examples. The frame structure shown in FIG. 4 represents a structure of wireless signals that may be sent and/or received by systems and in accordance with methods described herein.

Examples of frame structures which may be used include an downlink subframe (e.g., downlink subframe 465 of FIG. 4) and an uplink subframe (e.g., uplink subframe 467 of FIG. 4). Each subframe may include data, such as one or more symbols. Symbols as described herein, such as OFDM symbols, may refer to formatted data (e.g., data for transmission or receipt together with any prefix, preamble, etc.). In the example of FIG. 4, the frame may be a 5 ms frame, the downlink subframe 465 includes symbols 1 to 40 and the uplink subframe 467 includes symbols 44 to 55. Each symbol in the example of FIG. 4 is approximately 94 us in duration including a 2.6 us cyclic prefix and a 91.4 us FFT data. Other cyclic prefix and data lengths are possible, as well as other symbol structures. The FFT duration in the example of FIG. 4 is 4096 points/44.8 MHz sample rate=91.4 us.

Examples of frames described herein may include a control channel element which may carry data used to control and/or provide information about a channel. In the example of FIG. 4, symbol 1 downlink carries control channel element 471. Examples of frames described herein may include one or more reference symbols used to train a beamformer (e.g., an uplink and/or downlink beamformer) and/or initialize an equalizer. In the example of FIG. 4, symbols 2 and 3 are reference symbols 472 and may be used to train a downlink receive beamformer. In examples that don't use beamforming, the reference symbols 472 may be used to initialize an equalizer.

Frame structures described herein may be used to transmit and/or receive data. Accordingly, multiple symbols in each frame may contain data intended to be transmitted and/or received. As described herein, data may be received and/or transmitted using payload subcarriers and dual use subcarriers (e.g., payload information and dual information). In the example of FIG. 4, symbols 4 to 39 transport 473 downlink payload and dual information. Other number of downlink symbols are possible. The downlink transmitter and receiver may use symbol 40 in the example of FIG. 4 for analog electronics calibration 474, it being only 48.3 us in duration in the example of FIG. 4, although other lengths or positions of the calibration symbol may be used in other examples.

Examples of frame structures described herein may include a gap between an uplink and downlink portion of the frame. For example, in the example of FIG. 4, the frame structure includes gap 466 between the downlink and uplink. The gap may be provided so that analog electronics may switch between transmit and receive and/or for the propagation delay through the channel in some examples. The gap may typically be a non-integer number of symbols. Referring to the uplink portion of the frame structure of FIG. 4, symbol 44 carries uplink control channel element information 475. Symbols 45 and 46 are reference symbols 476 that may be used to train the uplink receive beamformer or equalizer. Symbols 47 to 54 transport uplink payload and dual information 477. Other number of uplink symbols are possible, as are other positions of the described symbols. Symbol 55 may be used for analog electronics calibration 478, its FFT duration again being only 2048 points in the example of FIG. 4. There is a gap 468 between the uplink and a subsequent downlink (not shown in FIG. 4), which may be used for analog electronics to switch between transmit and receive and/or for the propagation delay through the channel; the gap is typically a non-integer number of symbols.

Only two of several subbands are shown in FIG. 4: subband n 469 and subband n+1 470. Generally, a subband may refer to a range of frequency that may include multiple subcarriers. A subband may include a sufficient number of payload and dual subcarriers for receivers described herein to decode output bits. In the example of FIG. 4, each subband includes 52 subcarriers which represent 44 payload subcarriers 481 and 8 dual subcarriers (e.g., dual use subcarrier) subdivided into 4 upper dual subcarriers 432 and 4 lower dual subcarriers 483. Other numbers of payload and/or dual subcarriers may be used in other examples. The subcarriers within a subband are distributed from low frequency to high frequency as follows in the example of FIG. 4: 1 payload, 7 repeats of 1 dual plus 6 payload, 1 dual, and 1 payload. Other distributions may be used in other examples.

Figure 5:
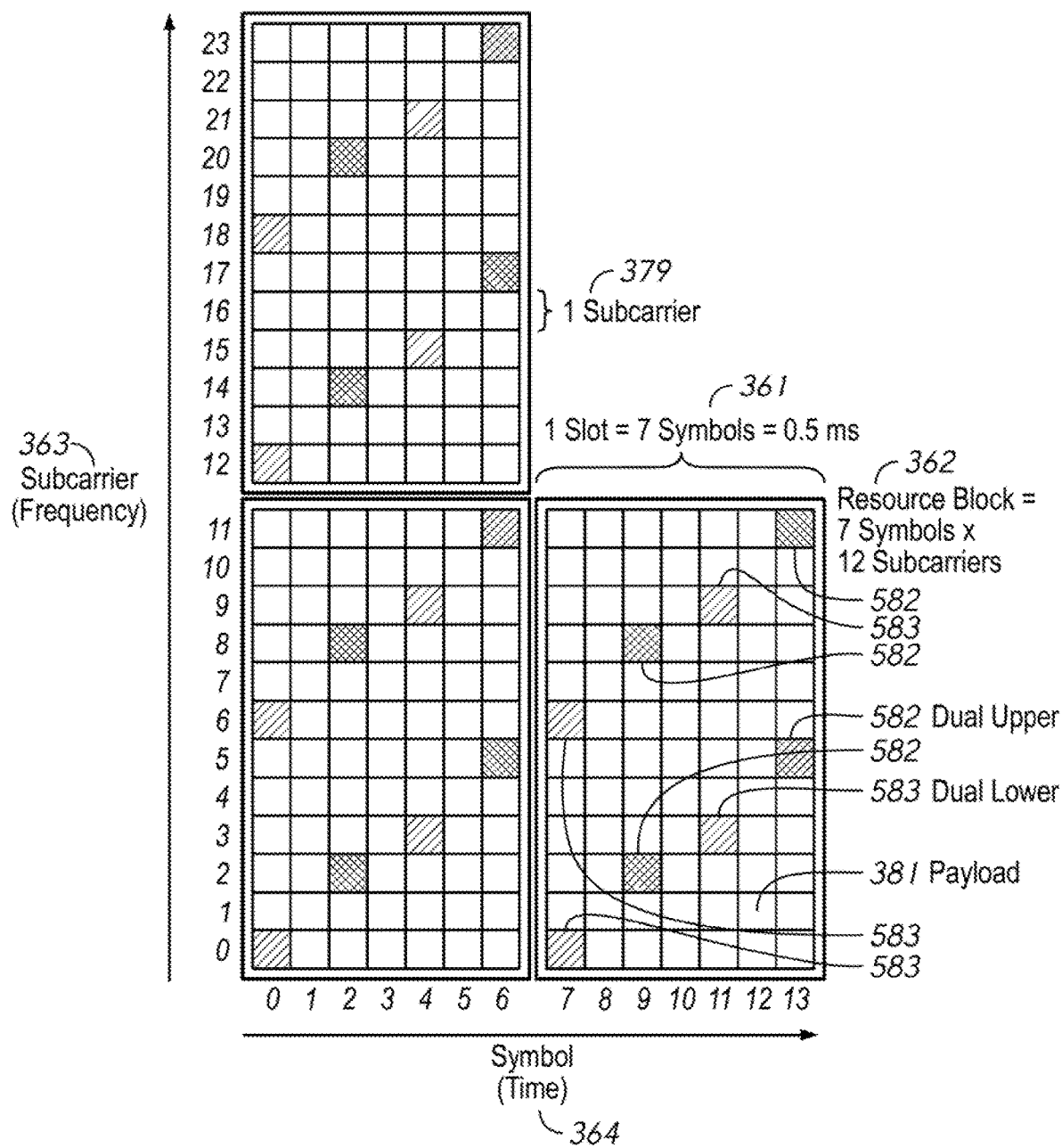
FIG. 5 is a schematic illustration of an LTE block arranged in accordance with systems and methods described herein.

FIG. 5 is a schematic illustration of three LTE resource blocks arranged in accordance with systems and methods described herein. Some portions of the LTE resource block may be the same as in other systems (e.g., as described with reference to FIG. 3, and bearing same reference numbers in FIG. 5). However, in FIG. 5, four LTE pilot symbols are used to implement four dual lower subcarriers 583 (e.g., dual use subcarriers as described with reference to FIG. 4). Four payload subcarriers are repurposed as dual upper subcarriers 582 (e.g., dual use subcarriers as described with reference to FIG. 4). FIG. 5 illustrates one set of locations for the four dual upper subcarriers, however, other locations within the resource block may also be used. The pilot pattern of FIG. 3 may be used for a first slot and the dual subcarrier pattern of FIG. 5 may be used for subsequent slots of the downlink subframe.

TABLE 1

Subcarrier Assignments Per Subband.

| | | | Examples described herein | | |
|---|---|---|---|---|---|
| Type | Pro-tocol | Typical | Subcarriers | Content | Name | Dual Encoder Output |
| A | AA2 | 44 payload | 44 payload | Payload | Payload | |
| B | AA2 | 4 payload | 4 upper dual | Payload | Upper Dual | Systematic |
| C | AA2 | 4 pilot | 4 lower dual | Check | Lower Dual | Check |
| A | LTE | 76 payload | 70 payload | Payload | Payload | |
| B | LTE | 4 payload | 4 upper dual | Payload | Upper Dual | Systematic |
| C | LTE | 4 pilot | 4 lower dual | Check | Lower Dual | Check |

Table 1 provides an explanation of the use of particular subcarriers in an AA2 resource block. The table provides an example for each of two protocols—an AA2 protocol and an LTE protocol. Table 1 also provides the use of the subcarrier in a typical implementation of the protocol (e.g., as shown in FIG. 1 and FIG. 3) as well as the use of the subcarriers in accordance with systems and methods described herein (e.g., as shown in FIG. 4 and FIG. 5). As shown in column 3 of Table 1, the AA2 typical subband structure of 52 subcarriers included 48 payload subcarriers which are split into (A) 44 payload subcarriers and (B) 4 payload subcarriers. The LTE typical resource block of 84 subcarrier-symbols included 80 payload subcarriers-symbols which are split into (A) 76 payload subcarriers-symbols and (B) 4 payload subcarriers-symbols. In both protocols, there are (C) 4 pilot subcarriers. Other numbers of subcarriers and pilots may be used in other examples.

The fourth column of Table 1 shows how the 52 subcarriers for the AA2 protocol are allocated in accordance with examples described herein. There are (A) 44 payload subcarriers and (B & C) 8 dual use subcarriers. The (A) 44 payload subcarriers carry encoded payload bits. The 4 upper dual subcarriers (B) also carry a few encoded payload bits, these encoded payload bits are provided as input to a rate 1/2 dual encoder. The output of the dual encoder includes dual systematic bits (B) and dual check bits (C). The dual systematic bits (B) modulate the 4 upper dual subcarriers 482 in FIG. 4 and the dual check bits (C) modulate the lower dual subcarriers 483. The term "dual" or "dual use" is used for the dual (B & C) subcarriers in part because they were formed from what might typically have been instead allocated as payload and pilot subcarriers. Another way that they are "dual" is that they carry two types of bits: dual systematic bits (B) and dual check bits (C). Note that the lower dual subcarriers are repurposed to carry dual check bits (C) rather than only pilots.

For the LTE protocol, the 84 subcarriers may be allocated to (A) 76 payload subcarriers and (B & C) 8 dual carriers. The (B) upper dual and (C) lower dual have the same general use and meaning for both the AA2 and LTE protocols. The dual systematic bits (B) modulate the 4 upper dual subcarriers 582 in FIG. 5 and the dual check bits (C) modulate the lower dual subcarriers 583.

TABLE 1

Dual Subcarrier Content.

| Constellation Size | Bits per subcarrier, $N_{MOD/SC}$ | # Dual Systematic Bits (B), K | # Dual Check Bits (C), M | # Dual Encoded Bits, N | Dual Code Name |
|---|---|---|---|---|---|
| QPSK | 2 | 8 | 8 | 16 | 8-16 |
| 1.6QAM | 4 | 16 | 16 | 32 | 16-32 |
| 64QAM | 6 | 24 | 24 | 48 | 24-48 |
| 256QAM | 8 | 32 | 32 | 64 | 32-64 |

Table 2 describes the contents of the dual subcarriers in further detail. The first column is the constellation size for both the payload and the dual subcarriers. The second column are the number of bits per subcarrier for the given modulation. Table 2 includes information for examples of QPSK, 16QAM, 64QAM, and 256QAM. Other modulations may be used in other examples. The payload subcarriers and dual subcarriers may preferably use the same modulation, it being less complex to implement in some examples. Column three describes the number of encoded payload bits that are selected to become the dual systematic bits (B) to be transmitted on the upper dual subcarriers 482 in FIG. 4 or 582 in FIG. 5. Since there are 4 upper dual subcarriers in this example, column 3 is 4 times column 2. The dual systematic bits are applied to the dual encoder thereby producing the dual check bits (C) whose number is listed in column 4 and which modulate the lower dual subcarriers 483 in FIG. 4 or 583 in FIG. 5. The dual systematic bits (B) plus the dual check bits (C) may be referred to as dual encoded bits. The name of the dual code may refer to the number of systematic bits and the number of encoded bits.

Examples of transmitters described herein may include two encoders: a payload encoder and dual encoder. In some examples, two separate encoders may be used, however in other examples the encoders may be wholly or partially physically integrated. The output of the payload encoder are payload encoded bits and they constitute a transport block for the AA2 protocol or a code block for the LTE protocol. Examples of a "transport block" include the output of the payload encoder for either the AA2 protocol or the LTE protocol. There are one or more resource blocks per transport block. The payload encoded bits that correspond to the upper dual subcarriers of each resource block are encoded again by the dual encoder. The output of the dual encoder is the dual encoded bits including dual systematic bits and dual check bits. "Systematic" generally references that the input to the dual encoder (e.g., selected payload encoded bits) may be identical to the dual systematic bits (B). The remaining portion of the dual encoded bits are the dual check bits (C). For the AA2 protocol, an example transport block spans 8 resource blocks. For each transport block, the dual encoder may be run 8 times, each time accepting a different set of bits corresponding to the upper dual subcarriers of each resource block of the transport block, the number of bits in each set given in column 3 of Table 2. Other numbers of resource blocks per transport block and repetitions of the dual encoder may be used in other examples.

Accordingly, systematic bits in the upper dual subcarriers may be protected by two LDPC codes in examples described herein. One of the codes may be referred to as a dual code or a short dual code. The dual code may generally be used to recover the modulation on the dual subcarriers. Another of the codes may be referred to as a payload code or a long payload code. The payload code generally permits the recovery of the transport block for AA2 or code block for LTE. In this manner, the upper dual subcarriers are used twice, by both the short dual code (e.g., as systematic bits) and by the long payload code. The dual subcarriers have a dual use, they are both used to transport part of the payload and they are used by adjustment signal generators described herein (e.g., PLLs) as pilots. In some examples, 8 dual subcarriers were used, in contrast to 4 known pilots used to transmit a same amount of payload data without use of techniques described herein. Relative to such systems, the techniques utilizing dual subcarriers described herein may not increase the number of subcarriers in a subband, but rather use the subcarriers in the subband in a more efficient manner to accomplish the functions of payload transport and pilots for phase and/or amplitude tracking (e.g., using an adjustment generator such as a PLL).

Techniques utilizing known pilots may have used 4 pilot subcarriers to perform phase tracking and 48 subcarriers per subband for payload. However, examples described herein utilizing dual subcarriers may take 4 of the 48 payload subcarriers plus the 4 pilot subcarriers and instead utilize 8 dual subcarriers, the data on these 8 dual subcarriers being protected by a short forward error correction code. Techniques described herein may accordingly utilize 8 subcarriers for phase tracking when transmitting the same amount of data for which the previous technique utilized only 4. Since receivers described herein may use twice the number of subcarriers for phase tracking than other receivers, their variance in the estimate of the phase error due the thermal noise may be reduced by a factor of 2 in some examples compared to receivers that do not utilize the techniques (under the assumption that both receivers have the same PLL bandwidth).

Examples described herein may accordingly be advantageous in use cases having fast channel changes. Since techniques described herein may utilize in some examples twice the number of subcarriers for phase tracking than systems not employing these techniques, the same receive performance may be achieved with a loop bandwidth that is twice as wide. A wider loop bandwidth means that the system may track faster channel changes than a receiver which did not employ the techniques described herein, given that both receivers have the same variance in the rotation phasor.

Figure 6:
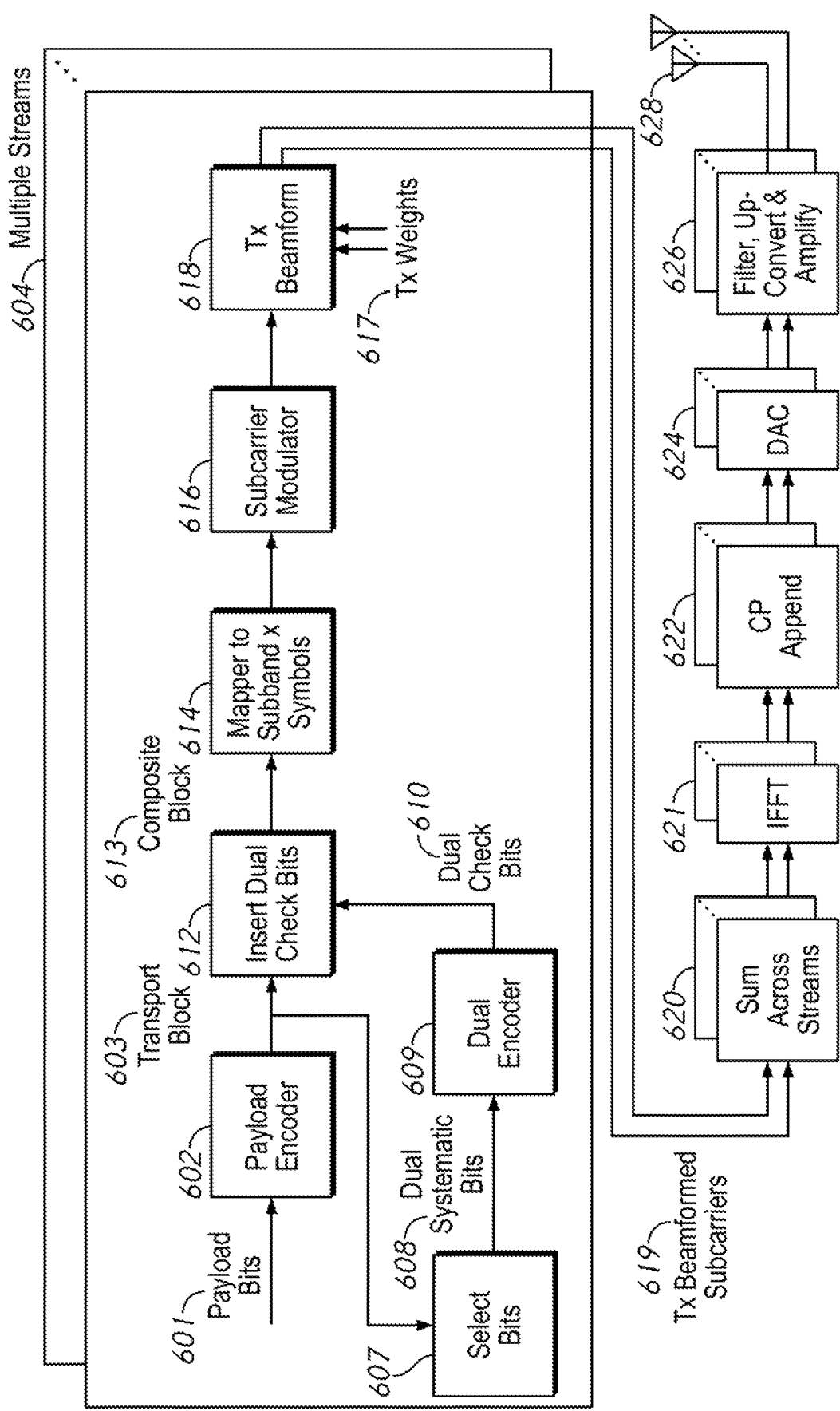
FIG. 6 is a schematic illustration of a transmitter arranged in accordance with examples described herein.

FIG. 6 is a schematic illustration of a transmitter arranged in accordance with examples described herein. The transmitter of FIG. 6 includes two encoders as described herein—payload encoder 602 and dual encoder 609. Payload bits 601 may be provided to a transmitter. The payload bits 601 may be provided, for example, as a physical layer service data unit (PSDU) from a media access control (MAC) layer. The payload bits 601 may be bits which are desired to be sent across a link (e.g., bits representing data such as text, image(s), video(s), or other information to be sent across a link to a receiver). The payload bits 601 may be encoded by the payload encoder 602. The payload encoder 602 may append check bits to the systematic payload bits (e.g., at one end or another of a bit string, or interspersed in the bits), thereby forming the encoded payload bits of a transport block for the AA2 protocol or a code block of the LTE protocol (e.g., also known as a forward error correction block). The transport block may be mapped onto multiple subcarriers, e.g., using mapper 614. For examples implementing the AA2 protocol, each transport block 603 may be mapped onto $N_{SC/TB}$=384 subcarriers per transport block (8 resource blocks 48 payload subcarriers per resource block). With $N_{MOD/SC}$ encoded bits per subcarrier (per column 2 of Table 2), the number of encoded bits in a transport block would be:

$$N_{TB}=N_{SC/TB}N_{MOD/SC}.$$

The code rate of the payload encoder 602 may be expressed as:

$$R=K/N_{TB}.$$

where K is the number of bits per PSDU. Thus, the PSDU size in bits may be the product of the code rate, the number of encoded bits per subcarrier, and the number of subcarriers per transport block:

$$K=R\ N_{MOD/SC}N_{SC/TB}.$$

Certain dual subcarriers may be selected from the transport block. For example, for each of the 8 resource blocks in the example of FIG. 5 and FIG. 6 that constitute a transport block 603, the transport block bits corresponding to the 4 upper dual subcarriers (e.g., row B of Table 1) may be selected by selector 607. Each of the 8 sets of selected transport block bits (e.g., dual systematic bits 608) may be provided as input to the dual encoder 609. The dual encoder 609 may produce 8 sets of dual check bits 610. For each set, examples of the number of input bits and number of check bits for the dual encoder 609 are given as columns 3 and 4 of Table 2. The dual check bits from each of the 8 sets are combined 612 (e.g., using a combiner) with the transport block. In this manner, when the composite block of bits 613 are modulated onto subcarriers by mapper 614 and modulator 616, the dual check bits (e.g., row C of Table 1) correspond to the lower dual subcarriers of the subband. In another example architecture, the dual subcarriers may be modulated by the dual check bits and such subcarriers may be inserted into the payload subcarriers.

The composite bits may be mapped to subbands and symbols in accordance with examples described herein. In some examples such as those utilizing the AA2 protocol, the composite block of bits 613 may be provided to the payload mapper 614 that maps them to subbands and symbols. For example, a composite block could be mapped to a region that is 1 subband ($N_{SC/SB}$ subcarriers in frequency)×8 OFDM symbols (in time). Other possible mappings include 2×4, 4×2, and 8×1.

The payload subcarrier modulator 616 may convert $N_{MOD/SC}$ encoded bits to the modulation on each subcarrier. For example, 16QAM uses $N_{MOC/SC}$ 4 encoded bits to describe 2+=16 different complex numbers representing the in-phase and quadrature components of each subcarrier. Other modulation schemes may also be used.

For each subband, the transmit beamformer 618 may multiply the complex samples for the subcarriers by the complex transmit weights 617, thereby forming the Tx beamformed subcarriers 619. For each subband, the number of Tx beamformed subcarriers may be expressed as: $N_{SC/SB}$ subcarriers×$N_{TX\_ANT}$ RF paths×$N_{STR}$ streams. The Tx beamformed subcarriers 619 may be summed across the streams. Each RF path may include an inverse fast-Fourier transform 621, cyclic prefix append 622, digital to analog converter 624, lowpass filter, upconverter, and power amplifier 626, and antenna 628. There are $N_{TX\_ANT}$ RF paths shown in the lower half of FIG. 4. The transmit beamformer 618 may implement either diversity transmission of a subband of subcarriers across multiple antennas for each independent symbol for the AA2 protocol or space-time block-codes (STBCs) in which a subband of 12 subcarriers are distributed among multiple antennas and across symbols (time) for the LTE protocol in some examples. Other implementations may also be used.

A stream may generally refer to a different set of payload 601 (and dual 608) bits sent to a different receiver (or to the same receiver but through a different propagation channel) by the application of different transmit weights 617. Thus an additional payload encoder 602, bit selector 607, dual encoder 609, inserter 612, mapper 614, modulator 616, and transmit beamformer 618 may be provided 604 for each stream.

The streams for each antenna may be summed by summer 620 in the frequency domain and the various subbands that make up the transmitter's passband may be aggregated. The IFFT 621 converts from frequency domain samples to the time domain samples. To mitigate the time dispersion through the channel, a cyclic prefix may be appended to the time domain samples from the IFFT thereby forming a Tx OFDM symbol. The samples of each Tx OFDM symbol may be sent to in-phase and quadrature digital-to-analog converters (DACs) 624. The in-phase and quadrature baseband signals may be lowpass filtered, zero-IF upconverted to a radio frequency (RF), and amplified 626. The RF signal may then be radiated by the antenna associated with a particular RF path 628. For each stream, the transmit weights 617 may contain the phase and amplitude information for each subband that comprises the signal radiated by each antenna. In the propagation channel, the signals from each antenna may be added together so that at some azimuths, the signals add coherently forming a strong beam for some streams in the direction of interest and nulls in the directions of receivers for which the streams are not intended to be broadcast. The payload encoder 602, bit selector 607, dual encoder 609, inserter 612, mapper 614, modulator 616, transmit beamformer 618, summer 620. IFFT 621, and CP appender 622 functions may be implemented as modules within one or more field programmable gate arrays (FPGAs), application-specific integrated circuits (ASICs), EASICs which may be somewhat between an FPGA and an ASIC, digital-signal processor (DSPs), or combinations thereof.

Accordingly, as described herein payload bits may be encoded by a payload encoder to provide encoded bits (e.g., a transport block). Selected ones of the encoded bits may be referred to as dual systematic bits. The dual systematic bits may be provided to a dual encoder, and encoded to provide dual check bits. The dual check bits may be inserted into the encoded bits (e.g., at one end or another of a bit string, or interspersed in the transport block) to form a composite block. The composite block may be mapped to subcarriers and modulated for radio frequency transmission. The radio frequency transmissions may accordingly be arranged in accordance with the frame structures described herein, such as with reference to FIG. 4 and FIG. 5.

Figure 7:
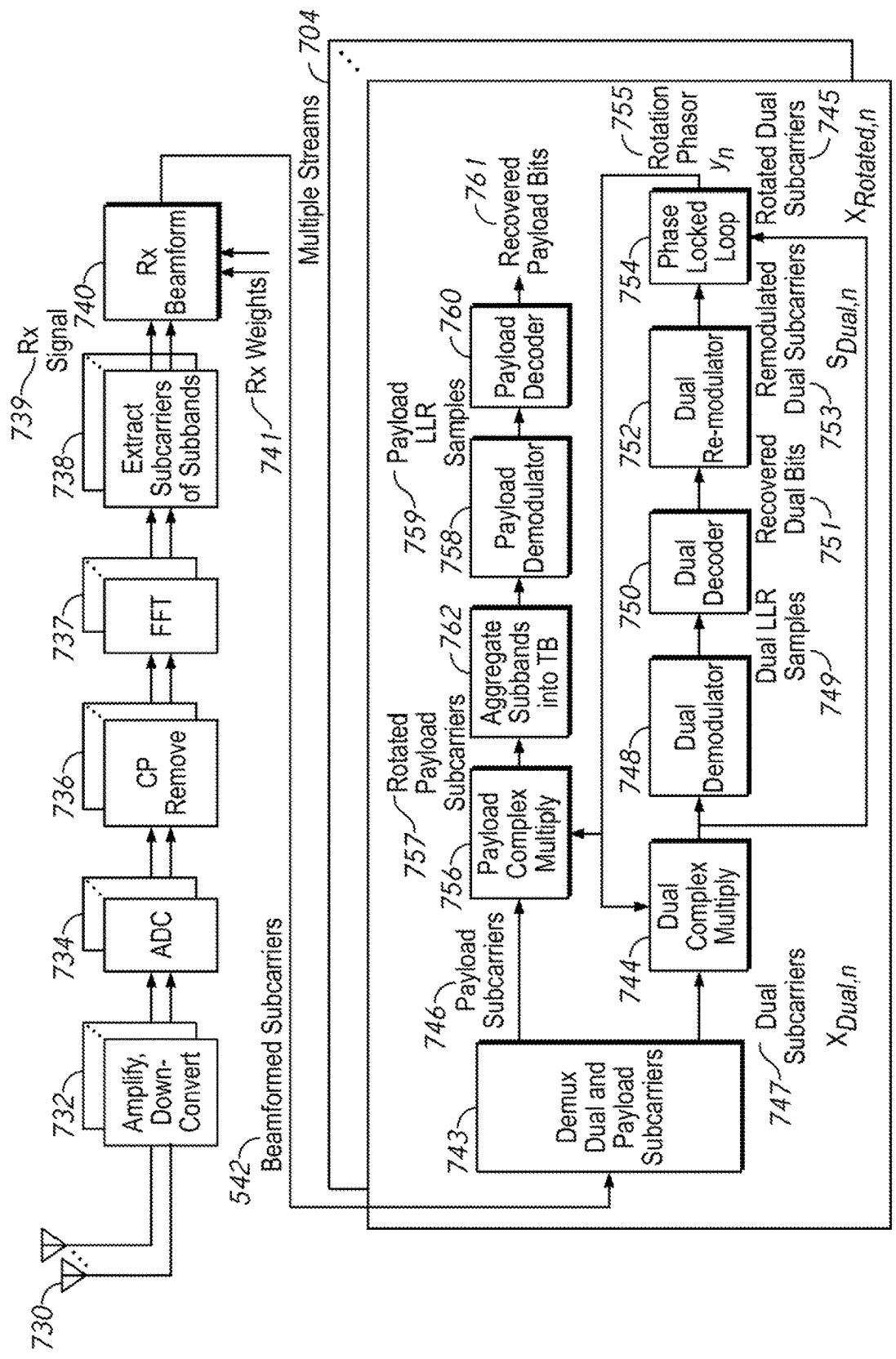
FIG. 7 is a schematic illustration of a receiver arranged in accordance with examples described herein.

FIG. 7 is a schematic illustration of a receiver arranged in accordance with examples described herein. The example of FIG. 7 may be used to implement a receiver in accordance with the AA2 protocol described herein. The receiver of FIG. 7 includes $N_{TX\_ANT}$ RF paths, each RF path including an antenna 730, a low noise amplifier and zero-IF downconvener and lowpass filter 732, an in-phase and quadrature analog to digital converter (ADC) 734, a remover of the cyclic prefix 736, a fast-Fourier transform 737, and a collector 738 of the subcarriers associated with each subband. For each subband and each symbol, the Rx signal 739 input to the Rx beamformer 740 may be considered to be a complex matrix consisting of: $N_{SC/SB}$ subcarriers×$N_{TX\_ANT}$ RF paths. The Rx weights 741 may be considered to be a complex matrix consisting of $N_{TX\_ANT}$ RF paths×$N_{RX\_STR}$ streams. The Rx beamformer 740 may therefore be considered a complex matrix multiplication of the Rx signal 739 with the Rx weights 741 yielding the Rx beamformed subcarriers 742, a matrix with a size of $N_{SC/SB}$ subcarriers× $N_{RX\_STR}$ streams. The CP remover 736. FFT 737, extractor 738, beamformer 740, demux 743, dual complex multiply 744, dual demodulator 748, dual decoder 750, phase locked loop 754, payload complex multiply 756, aggregator 762, payload demodulator 758, and payload decoder 760 functions may be implemented as modules within one or more field programmable gate arrays (FPGAs), application-specific integrated circuits (ASICs), EASICs which may be somewhat between an FPGA and an ASIC, digital signal processor (DSPs), or combinations thereof.

Items 743 to 761 of FIG. 7 may be replicated 704 for each stream and the signal processing for one such stream will now be discussed. The demux 743 may route all payload subcarriers 746 including upper dual subcarriers to the payload complex multiplier 756. The demux 743 may route all dual subcarriers 747 including upper dual subcarriers to the dual complex multiplier 744. The received dual subcarriers, $x_{Dual,n}$, 747 can be modeled as an 8 element vector:

$$x_{Dual,n} = \frac{1}{y_{a,n}} s_{Dual,n} + e_n$$

where n is the OFDM symbol index; $e_n$ is the error due to phase noise at frequencies higher than one-half of the OFDM symbol rate, thermal noise of the receiver, co-channel interference not nulled by the transmit and receive beamformers, and droop across the subband not equalized by the beamformers; $s_{Dual,n}$ is the dual subcarrier modulation 753; and $y_{a,n}$ is the actual impairment on the subband due to receive beamformer misadjustment, time varying differences between the local oscillator's phase noise at the transmitter and the receiver, and time varying changes in the propagation channel including phase changes due to Doppler. If the dual decoder 750 correctly performs its forward error correction, then the re-modulated dual subcarriers, $s_{Dual,n}$, are identical to those transmitted by the transmitter. A complex rotation phasor, $y_n$ 755, may be computed by the phase locked loop 754 so that the received dual subcarriers 747, $x_{Dual,n}$, multiplied 744 by the rotation phasor 755, $y_n$, produces the rotated dual subcarriers 745, $x_{Rotated,n}$, which may be closely aligned in phase and amplitude to the actual dual subcarrier modulation 753, $s_{Dual,n}$. This may be considered equivalent to saying that $y_n$ is close to $y_{a,n}$.

$$x_{Rotated,n} = y_n x_{Dual,n} = \frac{y_n}{y_{a,n}} s_{Dual,n} + y_n e_n.$$

Let $y_{e,n}$ be the error in estimating the rotation phasor due to $e_n$:

$y_n = y_{a,n} + y_{e,n}.$

Combining the above two equations yields:

$$x_{Rotated,n} = y_n x_{Dual,n} = s_{Dual,n} = \frac{y_{e,n}}{y_{a,n}} s_{Dual,n} + y_n e_n.$$

The first term on the right hand side of the above equation may represent the desired result, the actual dual subcarrier modulation, $s_{Dual,n}$. The middle term may be due to the mis-estimation of the optimal rotation phasor; meaning that $y_{e,n}$ may not zero due to the noise vector $e_n$. The final term may be due to the additive noise. The objective in estimating $y_n$ may be to reduce or minimize the average power in $y_n$:$E[y_{e,n}^2]$, rather than to minimize the rotated dual noise: $E[||y_n \ e_n||^2]$ in some examples.

An issue with typical systems may be that only a certain number of pilot subcarriers, 4 pilot subcarriers as described herein, were used to estimate $y_n$ whereas in examples of preferred embodiments described herein, a greater number of dual subcarriers may be used, such as 8 dual subcarriers, a factor of 2 improvement in the time-bandwidth product which corresponds to a reduction by a factor of 2 in the variance of $y_{e,n}$.

The receiver of FIG. 7 is an example implementation of receivers for processing payload and dual streams as described herein. Various changes may be made to FIG. 7 in other examples of receivers for processing payload and dual subcarriers. For example, the sequence of the demux 743 and the complex multiplies 756 and 744 may be changed in some examples (e.g., the complex multiplies may be performed before the dual subcarriers are separated by the demux).

Continuing on with FIG. 7, the dual subcarriers 747 may be multiplied 744 by the rotation phasor 755 thereby creating the rotated dual subcarriers 745 which in turn may be demodulated 748 thereby producing the dual log-likelihood ratio, LLR, samples 749. The dual LLR samples 749 may be applied to the dual decoder 750 which may produce the recovered dual bits 751, which may in turn be re-modulated 752 thereby forming the re-modulated dual subcarriers 753. The phase locked loop 754 may measure the phase difference between the rotated dual subcarriers 745 and re-modulated dual subcarriers 753 and may use this difference to compute a change to the rotation phasor 755. The payload subcarriers 746 may be multiplied 756 by the rotation phasor 755 thereby forming the rotated payload subcarriers 757. The subbands in frequency and/or symbols in time that contain a transport block are aggregated 762. The payload demodulator 758 may compute a payload LLR sample 759 for each bit of the transport block. In some examples, the receiver may first demodulate 758 and then aggregate the LLR samples into a transport block across subbands in frequency and/or symbols in time. The payload decoder 760 may operate on the LLR samples performing forward error correction thereby generating the recovered payload bits 761. When the payload decoder 760 is successful, the recovered payload bits 761 are identical to the payload bits 601 of the transmitter.

Examples of the dual encoder and dual decoder may be based on low density parity codes, LDPC. Other codes such as convolutional or Turbo codes may be used in other examples. An LDPC code is specified by its parity check matrix. When the parity check matrix (e.g., M checks×N encoded bits) is multiplied (e.g., modulo-2 arithmetic) by the N recovered bits (e.g., arranged as an N element column vector) from the LDPC decoder (e.g., when successful) or by the encoded bits from the LDPC encoder, the result is 0 (e.g., M checks×1).

An example of an 8-16 LDPC parity check matrix is shown in Table 3. The parity code may be referred to as low density in some examples if it has few 1's in its parity check matrix and thus can compactly be described by the location of such 1's as shown in Table 4. The first row of Table 4 indicates that the 1's in the first row of Table 3 occur in columns 0, 8, 9, and 10 of Table 3 (e.g., zero based indexing). Table 5, Table 6, and Table 7 describe the 16-32, 24-48, and 32-64 LDPC codes suitable for 16QAM, 64QAM, and 256QAM dual subcarrier modulation.

TABLE 2

8-16 Parity Check Matrix.

| 1 | 0 | 0 | 0 | 0 | 0 | 0 | 0 | 1 | 1 | 1 | 0 | 0 | 0 | 0 | 0 |
|---|---|---|---|---|---|---|---|---|---|---|---|---|---|---|---|
| 0 | 1 | 0 | 0 | 0 | 0 | 0 | 0 | 1 | 0 | 0 | 1 | 1 | 0 | 0 | 0 |
| 0 | 0 | 1 | 0 | 0 | 0 | 0 | 0 | 0 | 1 | 0 | 0 | 0 | 1 | 1 | 0 |
| 1 | 0 | 1 | 1 | 0 | 0 | 0 | 0 | 0 | 0 | 0 | 0 | 1 | 0 | 0 | 0 |
| 0 | 0 | 0 | 1 | 1 | 0 | 0 | 0 | 0 | 0 | 0 | 1 | 0 | 1 | 0 | 0 |
| 0 | 0 | 0 | 0 | 0 | 1 | 0 | 0 | 0 | 0 | 0 | 0 | 1 | 0 | 1 | 1 |
| 0 | 0 | 0 | 1 | 0 | 0 | 1 | 0 | 0 | 0 | 1 | 0 | 0 | 0 | 0 | 1 |
| 0 | 1 | 1 | 0 | 0 | 0 | 1 | 1 | 0 | 0 | 0 | 0 | 0 | 0 | 0 | 0 |
| 1 | 0 | 0 | 0 | 1 | 1 | 0 | 1 | 0 | 0 | 0 | 0 | 0 | 0 | 0 | 0 |

TABLE 3

8-16 LDPC code, Location of 1's.

| 0 | 8 | 9 | 10 |
|---|---|---|---|
| 1 | 8 | 11 | 12 |
| 2 | 9 | 13 | 14 |
| 0 | 2 | 3 | 12 |
| 3 | 4 | 11 | 13 |
| 5 | 12 | 14 | 15 |
| 3 | 6 | 10 | 15 |
| 1 | 2 | 6 | 7 |
| 0 | 4 | 5 | 7 |

TABLE 4

16-32 LDPC Code, Location of 1's.

| 3 | 11 | 15 | 17 | 24 | 29 |
|---|----|----|----|----|----|
| 4 | 5 | 9 | 12 | 13 | 17 |
| 0 | 5 | 20 | 28 | 29 | 31 |
| 0 | 16 | 19 | 22 | 25 | 30 |
| 4 | 6 | 8 | 20 | 26 | 30 |
| 0 | 8 | 10 | 11 | 12 | 23 |
| 6 | 9 | 14 | 15 | 23 | 25 |
| 2 | 9 | 16 | 18 | 20 | 21 |
| 13 | 18 | 24 | 25 | 26 | 27 |
| 2 | 3 | 4 | 14 | 22 | 31 |
| 1 | 7 | 18 | 22 | 23 | 29 |
| 2 | 5 | 7 | 8 | 15 | 27 |
| 10 | 17 | 19 | 21 | 26 | 31 |
| 7 | 11 | 13 | 14 | 19 | 28 |
| 1 | 3 | 6 | 10 | 16 | 27 |
| 1 | 12 | 21 | 24 | 28 | 30 |

TABLE 5

24-48 LDPC Code, Location of 1's.

| 7 | 10 | 18 | 30 | 38 | 45 |
|---|----|----|----|----|----|
| 2 | 4 | 19 | 25 | 28 | 45 |
| 15 | 20 | 28 | 29 | 32 | 42 |
| 1 | 8 | 11 | 13 | 24 | 25 |
| 21 | 30 | 34 | 35 | 37 | 40 |
| 12 | 23 | 32 | 35 | 44 | 45 |
| 11 | 17 | 19 | 20 | 34 | 46 |
| 2 | 3 | 9 | 36 | 40 | 46 |
| 1 | 2 | 5 | 6 | 15 | 37 |
| 1 | 3 | 7 | 29 | 43 | 47 |
| 16 | 17 | 33 | 36 | 44 | 47 |
| 6 | 27 | 30 | 32 | 33 | 46 |
| 8 | 13 | 15 | 38 | 43 | 44 |
| 7 | 11 | 14 | 16 | 37 | 42 |
| 0 | 10 | 12 | 21 | 24 | 31 |

TABLE 5-continued 24-48 LDPC Code, Location of 1's.

| | | | | | |
|---|---|---|---|---|---|
| 9 | 14 | 20 | 22 | 24 | 26 |
| 5 | 10 | 22 | 27 | 40 | 43 |
| 4 | 26 | 29 | 36 | 39 | 41 |
| 8 | 26 | 27 | 31 | 38 | 47 |
| 0 | 4 | 8 | 18 | 35 | 42 |
| 0 | 16 | 23 | 25 | 34 | 41 |
| 5 | 21 | 23 | 28 | 33 | 39 |
| 13 | 14 | 17 | 18 | 31 | 39 |
| 3 | 6 | 12 | 19 | 22 | 41 |

TABLE 6

32-64 LDPC Code, Location of 1's.

| | | | | | |
|---|---|---|---|---|---|
| 9 | 17 | 19 | 38 | 52 | 54 |
| 11 | 30 | 44 | 50 | 53 | 57 |
| 1 | 2 | 18 | 20 | 56 | 58 |
| 22 | 28 | 44 | 46 | 49 | 58 |
| 0 | 2 | 4 | 15 | 32 | 39 |
| 26 | 30 | 32 | 35 | 48 | 49 |
| 4 | 9 | 16 | 24 | 27 | 57 |
| 3 | 12 | 13 | 19 | 21 | 45 |
| 1 | 14 | 35 | 36 | 39 | 54 |
| 0 | 17 | 22 | 25 | 41 | 60 |
| 7 | 10 | 12 | 15 | 26 | 33 |
| 18 | 37 | 42 | 48 | 50 | 55 |
| 6 | 12 | 14 | 16 | 23 | 61 |
| 3 | 25 | 39 | 40 | 43 | 52 |
| 28 | 38 | 41 | 45 | 51 | 56 |
| 6 | 18 | 27 | 40 | 51 | 53 |
| 29 | 34 | 45 | 49 | 55 | 59 |
| 5 | 17 | 42 | 43 | 44 | 59 |
| 5 | 6 | 21 | 24 | 28 | 63 |
| 10 | 13 | 32 | 47 | 55 | 57 |
| 8 | 25 | 48 | 56 | 61 | 62 |
| 11 | 33 | 37 | 46 | 60 | 61 |
| 0 | 1 | 23 | 31 | 33 | 63 |
| 8 | 11 | 24 | 29 | 42 | 47 |
| 3 | 7 | 31 | 38 | 53 | 62 |
| 8 | 16 | 20 | 22 | 26 | 54 |
| 2 | 23 | 37 | 52 | 59 | 62 |
| 4 | 13 | 29 | 31 | 36 | 46 |
| 5 | 7 | 19 | 20 | 30 | 36 |
| 9 | 10 | 14 | 21 | 34 | 40 |
| 27 | 35 | 41 | 50 | 58 | 63 |
| 15 | 34 | 43 | 47 | 51 | 60 |

Other parity check matrices for codes of this size are possible; the tables provided herein are merely examples of suitable parity check matrices.

Figure 8:
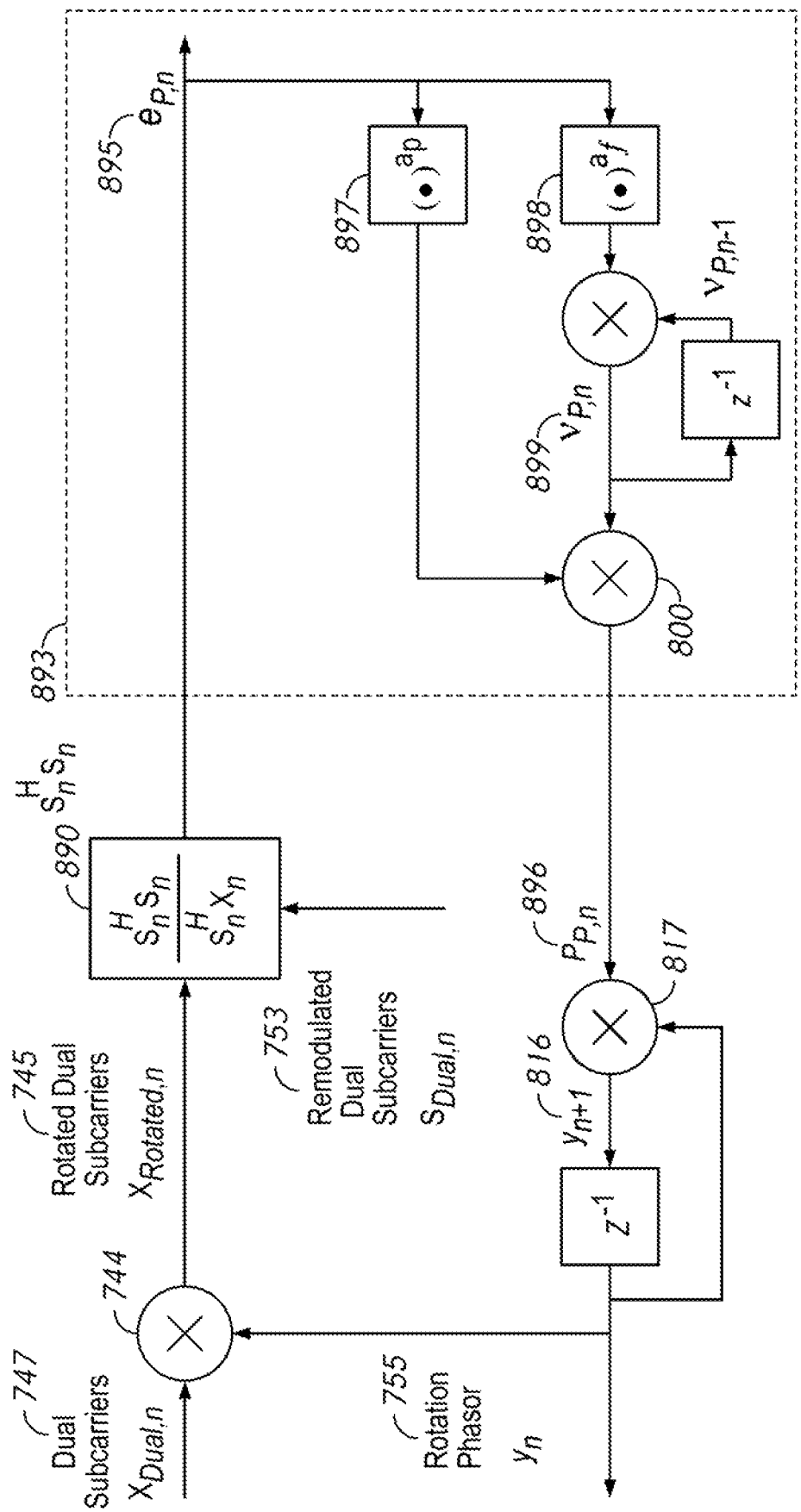
FIG. 8 is a schematic illustration of a multiplier and phase locked loop arranged in accordance with examples described herein.

FIG. 8 is a schematic illustration of a multiplier and phase locked loop arranged in accordance with examples described herein. FIG. 8 may be used to implement the complex multiplier 744 and phase locked loop 754 of FIG. 7. In the example of FIG. 8, the received dual subcarriers 747, $x_{Dual,n}$, may be multiplied 744 by the rotation phasor 755, $y_n$, thereby producing the rotated dual subcarriers 745, $x_{Related,n}$. The product domain error phasor 895, $e_{P,n}$ for OFDM symbol n may then be computed in block 890. Based on the following model, an unbiased estimate of the product domain error phasor may be obtained by assuming in some examples that the re-modulated dual subcarriers, $s_{Dual,n}$, 753 are orthogonal to the error, $e_n$ ($s_{Dual,n}^H e_n = 0$):

$$e_{P,n} x_{Rotated,n} = s_{Dual,n} + e_n.$$

Both sides of the above equation may be multiplied by the complex transpose of $s_{Dual,n}$, and then the product domain error phasor may be computed in block 890 as follows:

$$e_{P,n} = \frac{s_{Dual,n}^H s_{Dual,n}}{s_{Dual,n}^H x_{Rotated,n}}$$

Generally, any circuitry for processing may be used to implement the complex multiply in block 890 including, but not limited to, logic circuitry, one or more adders and/or multipliers, or one or more processors in communication with memory encoded with instructions for performing the multiply. In some examples, one or more application-specific integrated circuits (ASICs), field programmable gate arrays (FPGAs), and/or digital signal processors (DSPs) or combinations thereof may be used.

The noise processing gain may be referred to as the ratio of the output SNR to the input SNR. Since there are 8 dual subcarriers in this example, the noise processing gain may be 8, meaning that the variance of $e_{P,n}$ may be 8 times smaller than the thermal noise power to signal power ratio of one dual subcarrier due to thermal noise.

The product domain error phasor may contain both amplitude and phase information. In some examples, only phase information may be used, and a product domain error phasor can be computed in block 890 that has unity amplitude:

$$e_{P,n} = \frac{x_{Rotated,n}^H s_{Dual,n}}{|x_{Rotated,n}^H s_{Dual,n}|}$$

The noise processing gain of the phase only computation may be 16, 8 due to the number of subcarriers and 2 due to discarding the jitter in the amplitude direction in some examples.

The signal processing of the PLL is shown in the "product" domain in FIG. 8. The product domain error phasor 895 may have a value of 1 when the loop filter is tracking. The product domain error phasor may be raised to the $a_p$ power 897 and to the $a_f$ power 898. The values of $a_p$ and $a_f$ may determine the PLL's characteristics. A running product 899, $v_{P,n}$, may be computed which estimates the frequency error (e.g., the change in phase per sample). The frequency error 899 may be multiplied 800 by the output of the exponential block 897 thereby forming the product domain phase 896, $p_{P,a}$, which then passes Through a Running Product multiplier 817 to form the loop filter output: the rotation phasor 755, $y_n$. The rotation phasor may be used to implement an adjustment signal as described herein in some examples.

Figure 9:
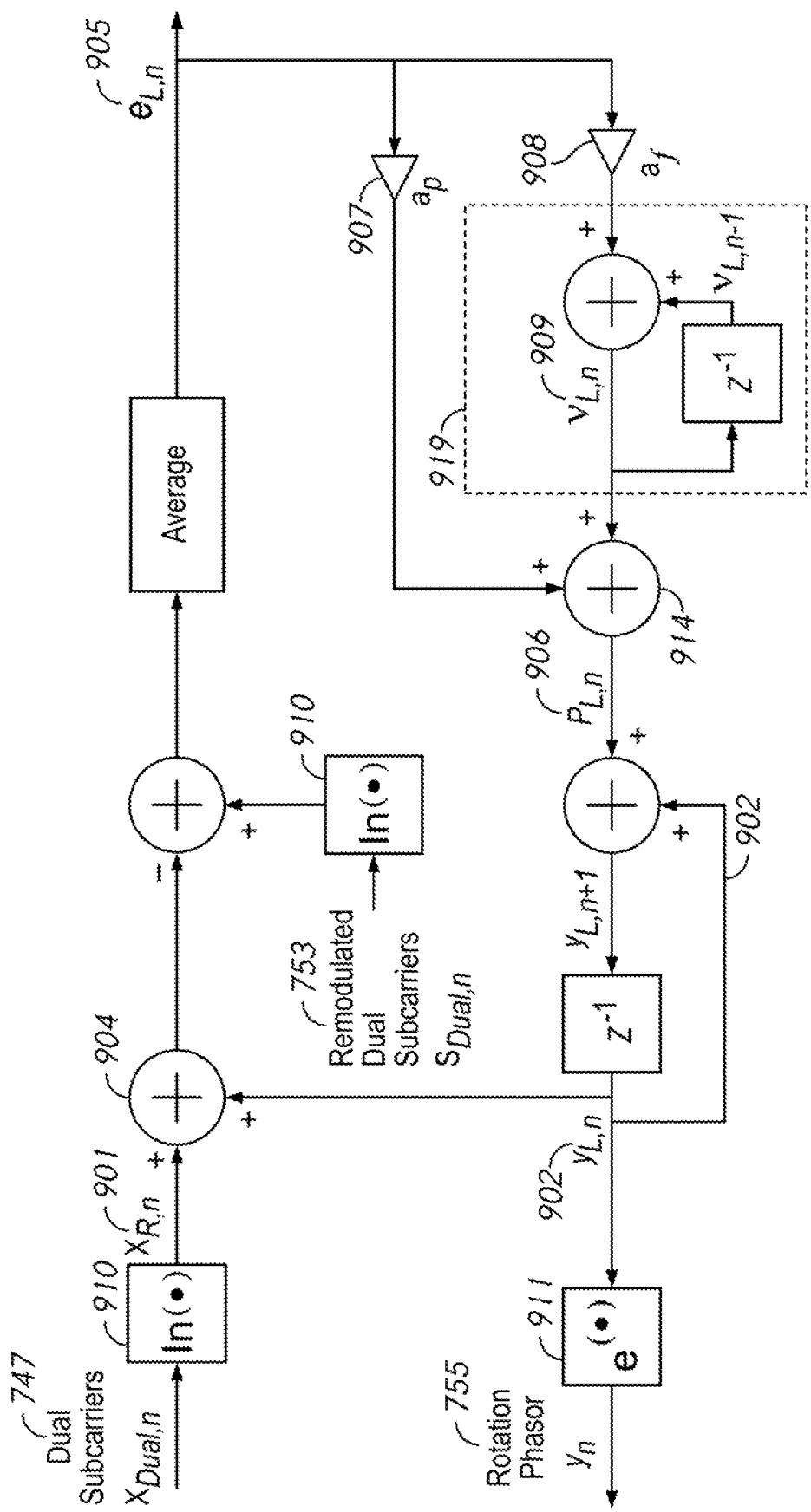
FIG. 9 is a schematic illustration of a multiplier and phase locked loop arranged in accordance with examples described herein.

FIG. 9 is a schematic illustration of a multiplier and phase locked loop arranged in accordance with examples described herein. The example of FIG. 9 illustrates an analogous implementation of the loop filter of FIG. 8, however, in the example of FIG. 9 the loop filter is shown in the "linear" domain. Multiplication, division, and exponentiation may be performed in the linear domain by addition, subtraction, and scaling using logarithms. The PLL of FIG. 8 in the "product" domain may be converted into the "linear" domain by taking the logarithm in block 910, replacing multiplication by addition, division by subtraction, and exponentiation by scaling, and then the final result passing through an anti-logarithm in block 911 thereby producing the loop filter output: the rotation phasor 755, $y_n$. The representation of FIG. 9 may lend itself to traditional analysis of a second order loop filter with $x_{R,n}$ 901 as its input and $y_{L,n}$ 902 as its output. The loop filter as shown in the example of FIG. 9 has two integrators and therefore can achieve zero steady state error at $e_{L,n}$ 905 for a phase ramp input at $x_{R,n}$ 901 in some examples.

Figure 10:
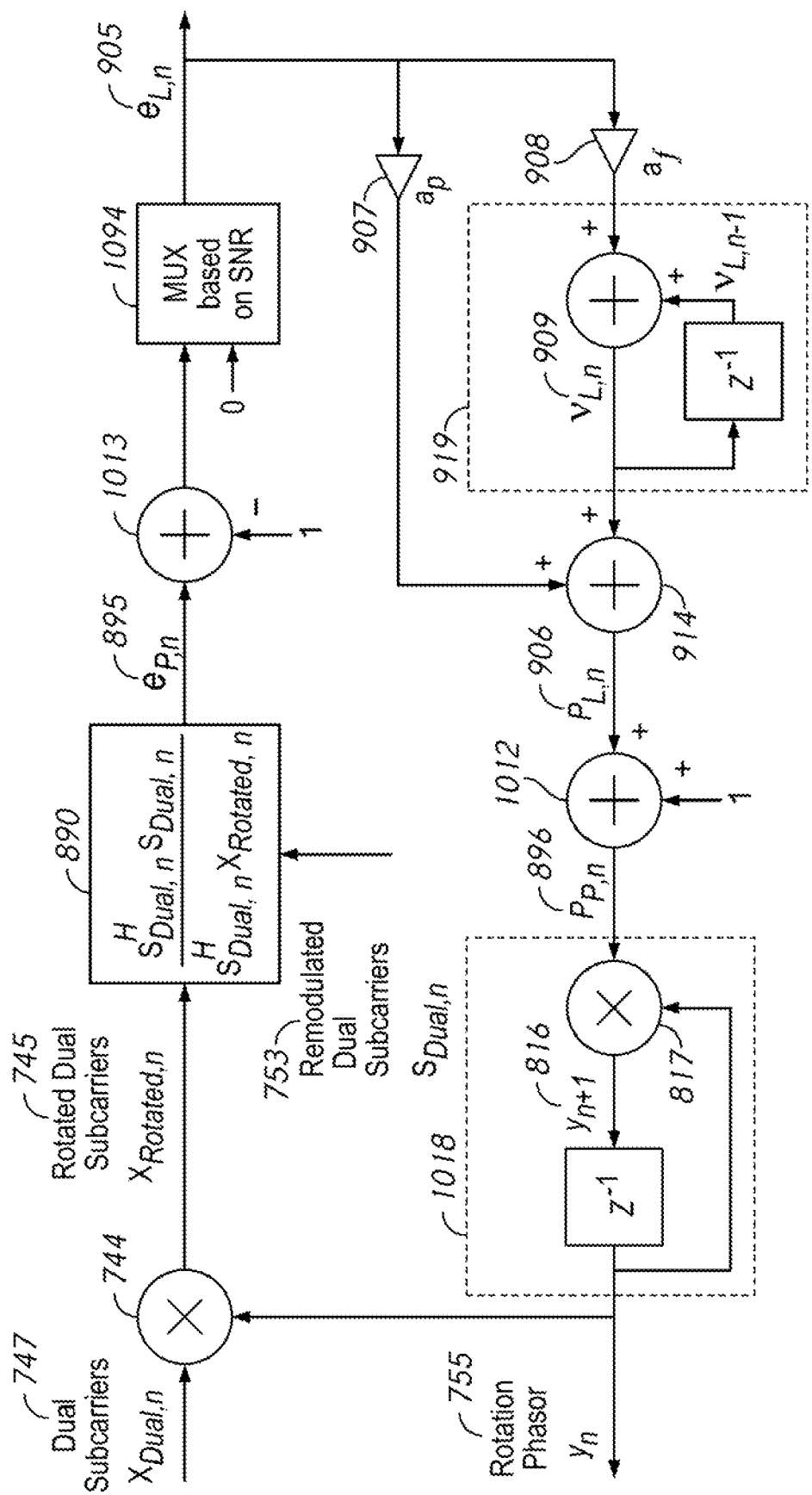
FIG. 10 is a schematic illustration of a multiplier and phase locked loop arranged in accordance with examples described herein.

To avoid computationally expensive log and anti-log computations in some examples, only the circuitry of block 893 in FIG. 8 may be converted to the "linear" domain and such an implementation is shown in FIG. 10. Given a linear domain signal r, its product domain representation, q, may be written as:

$$q=e^t=1+t+t^2/2+t^3/6+L+t^n/n!$$

When the linear domain signal is close to zero, the product domain signal can be approximated by its first two Taylor series terms:

$$q\approx 1+t$$

Error introduced by this approximation may be compensated by the loop filter since it incorporates feedback in some examples.

FIG. 10 is a schematic illustration of a multiplier and phase locked loop arranged in accordance with examples described herein. FIG. 10 illustrates multiplier and phase locked loop implemented partially in a linear domain. FIG. 10 shows the signal processing for digital signals which both time and amplitude are discrete as opposed to continuous-time or continuous-amplitude signals. The signal processing shown in FIG. 10 may be implemented in an FPGA, an ASIC, or a digital signal processor. As shown in FIG. 10, received dual subcarriers 747 may be multiplied 744 by the rotation phasor 755 thereby creating the rotated dual subcarriers 745 which may in turn be are correlated 890 by the re-modulated dual subcarriers 753 thereby producing the product domain raw rotation phasor 895 which may be converted to the linear domain error phasor 905, $e_{L,n}$, by subtracting 1, $e_{L,n}$ may be replaced by 0 by mux 1094 if the SNR is low or the dual decoder failed to find dual encoded bits that satisfy all of the checks of the parity matrix. $e_{L,n}$ may be scaled 908 by filter coefficient $a_f$ and integrated 919 thereby producing an estimate of the frequency error 909, $v_{L,n}$, with units of radians per symbol. The frequency error may be averaged across subbands to develop an estimate of the frequency error of the transmitter's oscillator relative to the receiver's oscillator plus the channel's Doppler. The frequency error 909 may be added 914 to the linear domain error signal scaled 907 by filter coefficient $a_p$, thereby producing the linear phase correction signal 906, $p_{L,n}$. The linear phase correction signal 906 may be converted 1012 to the product domain phase correction signal 896, $p_{P,n}$, by adding 1. The next running product domain rotation phasor 816, $y_{n+1}$, is the complex multiplication 817 of the product domain phase correction signal 896, $p_{P,n}$, with the rotation phasor 755, $y_n$. The final integrator 1018 may be implemented in the product domain while the frequency integrator 919 may be implemented in the linear domain. In other examples, the complex multiplier 744 may be replaced by a complex divider and the correlator 890 by one that computes the reciprocal of what is shown in FIG. 10; which may permit $v_{L,n}$ to be an estimate of the frequency error of the receiver's oscillator plus the channel's Doppler relative to the transmitter's oscillator.

Accordingly, the PLL of FIG. 10 has a final integrator 1018 implemented in the product domain while its frequency integrator 919 is implemented in the linear domain. Having two integrators, it can achieve zero steady state error in some examples for mobile applications that experience a Doppler frequency shift (e.g., a phase ramp in time). Furthermore, the PLL can operate in one of two modes: phase only tracking, or phase and amplitude tracking in some examples. For example, a PLL which tracks phase and amplitude changes across the receive subframe may be utilized to only track phase changes by computing a product domain error phasor that has unity amplitude or by using different loop filter coefficients for the real and imaginary components of the linear domain error phasor 905, $e_{L,n}$.

An advantage of the PLL architecture shown in FIG. 10 may be that the running product 755 is calculated 1018 in the product domain which supports all phase angles, not just those close to 0. Furthermore, it may lack a discontinuity at π radians. There is generally no limitation to representing any large phase excursion that could occur over the entire receive subframe. The approximation, $e^t\approx 1+t$, may not be used when calculating 817 the next running product domain rotation phasor 816, $y_{n+1}$, thereby maintaining precision. Provided that the loop bandwidth is adequate, the PLL may track generally any phase that causes the linear domain phase error 905, $e_{L,n}$, to be small in some examples. This may permit the loop filter (e.g., blocks 907, 908, 919, and 914) to be implemented in the linear domain thereby reducing a need for and/or avoiding the computationally expensive log and anti-log operations.

The values of $a_p$ and $a_f$ may determine the PLL bandwidth and resonance from a frequency domain perspective or the rise time and percent overshoot from a time domain perspective. For example, a PLL with an OFDM symbol rate of 10639 samples per second, having input $x_{Dual,n}$ and output $y_n$, and having $a_p$=0.33966 and $a_f$=0.019833; has a −3 dB bandwidth of 81 Hz, a maximum passband gain of +1 dB (resonance), a 0 to 100% rise time of 500 us for a step input, a peak overshoot of 11.1% for a step input, and a noise processing gain of 4. The noise processing gain may be the ratio of the thermal noise power to signal power of one of the dual subcarriers, $x_{Dual,n}$, divided by 8 to the variance of $y_n$ due to thermal noise. Other bandwidths and amount of resonance (or rise times and percent overshoot) are possible by choosing different filter coefficients in some examples.

Another technique of having a virtual phase only tracking PLL may be to apply the normal coefficients, $a_p$ and $a_f$ to the imaginary component of $e_{L,n}$ and smaller coefficients to the real component of $e_{L,n}$. This may permit the loop filter to rapidly track phase changes and slowly respond to amplitude changes, if there are any.

When the amount of frequency error is similar from the end of one OFDM receive subframe to the start of the next receive OFDM subframe, the loop filter may be initialized to retain the frequency error estimate, $v_{L,n}$, across frames. Suppose that the receiver is receiving the downlink and that the symbols are numbered with n=−2 for the first reference symbol 472,n=−1 for the second reference symbol, and n=0 for the first payload symbol 473. The signal processing may occur as described with reference to FIG. 10, for both the reference and payload symbols except: when n≤−2, then $y_n$=1+0j and $p_{L,n}$=$v_{L,n}$/2 and when n<0, then $e_{L,n}$=0. This causes $y_0$ to be initialized to $v_L^{1.5}$ where $v_L$ is the frequency error estimate from the last OFDM symbol of the previous receive subframe. Note that there may be 1.5 OFDM symbols between the middle of the two reference symbols and the middle of the first payload symbol as shown at the bottom left of FIG. 4. The phase error may be 0 halfway between the two reference symbols due to the computation of the receive beamformer weights, but progresses 1.5 samples by the middle of the first payload symbol.

When the frequency error is independent from the end of one OFDM receive subframe to the start of the next receive OFDM subframe, the loop filter may be initialized by zeroing the frequency error estimate, $v_{L,n}$, each frame when n<0: $y_n=1+0j$, $e_{L,n}=0$, and $v_{L,n}=0$.

An additional output of the dual decoder 550 may be a flag that indicates if all of the checks are satisfied. If one or more checks are not satisfied, then the linear domain error phasor 905, $e_{L,n}$, may be replaced by 0 using mux 1094, thereby not permitting a bad set of re-modulated dual subcarriers 753 to contaminate the frequency error estimate 909 or the linear phase correction signal 906. The sum of the squared distance between the rotated dual subcarriers 745 and the re-modulated subcarriers 753 may be computed and if such a sum exceeds a programmable threshold, then the linear domain error phasor 905 may also be replaced by 0 using mux 1094. The sum of the squared distance, comparison with a threshold, verification that all of the checks are satisfied, control and implementation of mux 1094 may be implemented by an FPGA, an ASIC, or a digital signal processor. This may aid in guarding against the dual decoder from finding a valid codeword that is not the correct codeword.

$$|x_{Rotate,n} - d_{Dual,n}|^2 > \text{threshold}$$

$$x_{Rotate,n}^H x_{Rotate,n} - 2\text{Re}(s_{Dual,n}^H x_{Rotated,n}) + s_{Dual,n}^H s_{Dual,n} > \text{threshold}$$

Only the first term in the above equation is new to this calculation as the second and third terms have to be computed by block 890 when finding the product domain raw rotation phasor 895.

In this manner, adjustment signals generated by adjusting circuitry (e.g., phase locked loops) herein may be overridden and/or changed under certain conditions. For example, when data fails to decode properly (e.g., some or all of the checks in a code fail), adjustment signals generated based on the improperly decoded data may not be utilized to adjust other received signals. Moreover, a programmable threshold may be used to specify a particular accumulated distance between the re-modulated subcarriers and the input subcarriers, and if the distance is greater than the threshold, the adjustment signals generated using those subcarriers may not be used o adjust other received signals. This may reduce or eliminate an impact of inaccurate adjustment signals on systems described herein.

Note that the PLL shown in FIG. 10 may be also be used for tracking phase, or phase and amplitude in receivers that utilize known pilot modulation (e.g., those without the dual subcarrier techniques described herein, or those that use both known pilots and dual subcarrier techniques including dual subcarrier demodulation, dual decoding, or dual remodulation). For example, when used with known pilot signals, the known pilot signals may be provided to the input 753 to the PLL. In this manner, the known pilot signals may be used as the known subcarrier modulation rather than the re-modulated subcarrier modulation in the case of dual subcarriers.

Figure 11:
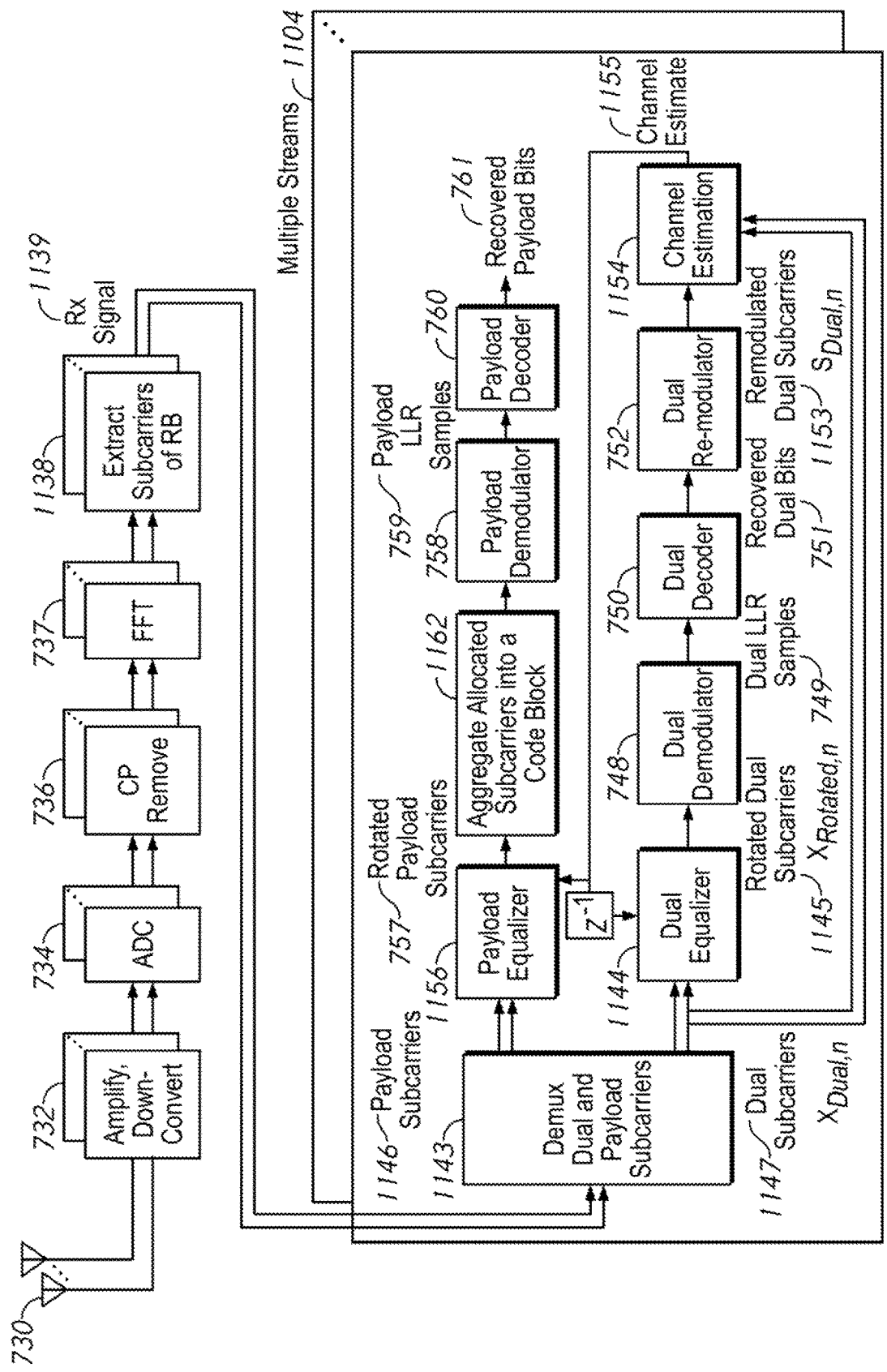
FIG. 11 is a schematic illustration of a receiver arranged in accordance with examples described herein.

FIG. 11 is a schematic illustration of a receiver arranged in accordance with examples described herein. The receiver of FIG. 11 may be used in examples where wireless communications may be received in accordance with the LTE protocol.

The example receiver of FIG. 11 includes $N_{RX\_ANT}$ RF paths, each RF path including an antenna 730, a low noise amplifier and zero-IF down-converter and lowpass filter 732, an in-phase and quadrature analog to digital convener (ADC) 734, a remover of the cyclic prefix 736, a fast-Fourier transform 737, and a collector 1138 of the subcarriers associated with each resource block, thereby forming the Rx signal 1139 having one of its dimensions equal to the number of receive antennas, $N_{RX\_ANT}$.

Blocks 748 to 761 and 1143 to 1162 of FIG. 1 may be duplicated as shown in block 1104 for each stream and the signal processing for one such stream will now be discussed. For the first LTE slot, the 4 re-modulated dual subcarriers 1153 per resource block may be taken from a set of 4 known pilot subcarriers 380. The dual equalizer 1144, dual demodulator 748, dual decoder 750, and dual re-modulator 752 may be skipped for the first LTE slot since it may use the frame structure of FIG. 3 which may use known pilot subcarriers 380 and therefore may lack dual lower subcarriers 583. For the second and subsequent LTE slots which use the frame structure of FIG. 5, the 8 re-modulated dual subcarriers 1153 per resource block may be computed by the dual equalizer 1144, dual demodulator 748, dual decoder 750, and dual re-modulator 752. The received signal 1139 may be demultiplexed 1143 into payload subcarriers 1146 and dual subcarriers 1147 each having one of its dimensions as $N_{RX\_ANT}$. The re-modulated dual subcarriers 1153 and the dual subcarriers 1147 may be used to compute 1154 the channel estimate 1155 for each dual subcarrier and RF path. The channel estimate may be used to implement an adjustment signal described herein. The dual equalizer 1144 may receive the channel estimate 1155 from the previous slot, filter the channel estimate across frequency and time, and extrapolate the channel estimate in time to form equalization coefficients for each subcarrier of the resource block of the current slot which are used to both collapse the $N_{RX\_ANT}$ RF paths into a single path, rotate, and scale the dual subcarriers 1147 into rotated dual subcarriers 1145.

The payload equalizer 1156 may receive the channel estimate 1155 from the current slot, filter and then interpolate the channel estimate in frequency and time to form equalization coefficients for each subcarrier of the resource block of the current slot which are used to both collapse the $N_{RX\_ANT}$ RF paths into a single path, rotate, and scale the payload subcarriers 1146 into rotated payload subcarriers 757. In this manner, the payload equalizer 1156 may be used to implement an adjustment generator described herein. The subcarriers that contain a code block may be aggregated 3162. The payload demodulator 758 may compute a payload LLR sample 759 for each bit of the code block. The payload decoder 760 may operate on the LLR samples performing forward error correction thereby generating the recovered payload bits 761.

The channel estimate 1155 based on the dual subcarriers accordingly may be used for payload equalization 1156, but also may be used in some examples to compute the channels phase progression with time which may be due to phase noise differences between the downlink transmitter and receiver or Doppler frequency shift.

The signal processing of FIG. 11 may be utilized in an analogous manner for MIMO LTE which uses a set of pilots for each stream. For such examples, the payload equalizer 1156 may also process channel estimates from multiple streams to undo the space-time coding used in MIMO LTE.

Accordingly, note that an LDPC encoder may be used at the transmitter (e.g., the encoder 609 shown in FIG. 6) and an LDPC decoder at the receiver (e.g., the decoder 750 of FIG. 7 or FIG. 11) for the information carried on the dual subcarriers. Systems which do not utilize the dual subcarrier techniques described herein may not utilize a dual LDPC encoder on payload at the transmitter for use by the receiver for PLL tracking. Moreover, systems which do not utilize the dual subcarrier techniques described herein would not use a dual LDPC decoder at the receiver since the pilots would be well known.

Figure 12:
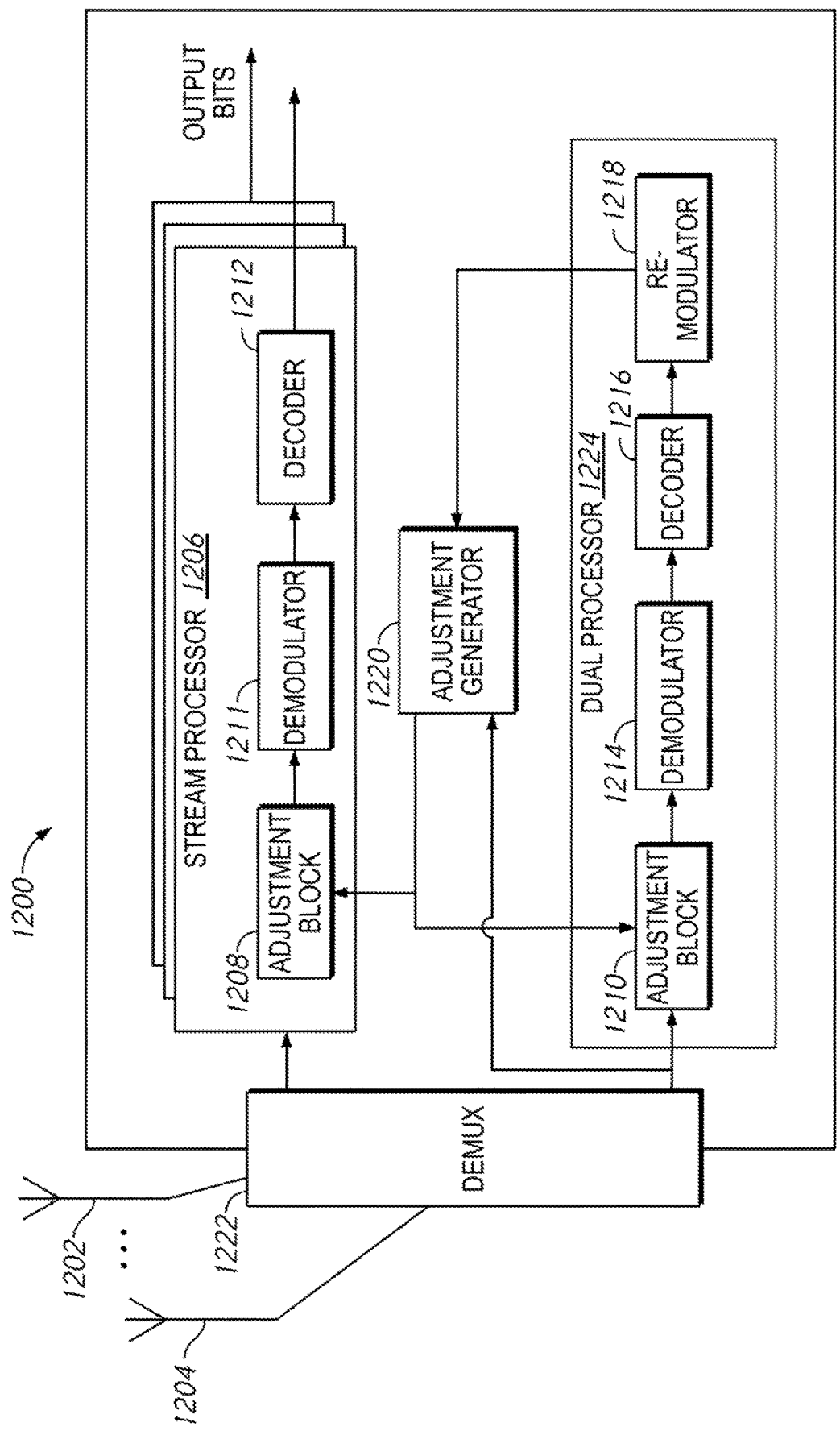
FIG. 12 is a schematic illustration of a receiver arranged in accordance with examples described herein.

FIG. 12 is a schematic illustration of a receiver arranged in accordance with examples described herein. The receiver 1200 of FIG. 12 includes antenna 1202, antenna 1204, demux 1222, stream processor 1206, dual processor 1224, and adjustment generator 1220. The stream processor 1206 includes adjustment block 1208, demodulator 1211, and decoder 1212. The dual processor 1224 includes adjustment block 1210, demodulator 1214, decoder 1216, and re-modulator 1218. The components shown in FIG. 12 are exemplary only. Additional, fewer, and/or different components may be used in other examples. The receiver 1200 may receive information arranged in frames, such as in accordance with the frame structure of FIG. 4 or FIG. 5.

The antenna 1202 and antenna 1204 are coupled to demux 1222. The demux 1222 may include signal processing functions of pre-selection filtering, low-noise amplification, down-conversion, baseband filtering, analog-to-digital conversion, cyclic prefix removal, fast Fourier transformation, beamforming, and subcarrier selection. The demux 1222 may couple certain subcarriers to the stream processor 1206 and certain subcarriers to the dual processor 1224. The subcarriers provided to the stream processor 1206 may be processed by the adjustment block 1208, followed by demodulator 1211, and followed by the decoder 1212 to provide output bits. The subcarriers provided to the dual processor 1224 may be processed by adjustment block 1210, followed by demodulator 1214, followed by decoder 1216, followed by re-modulator 1218. An output of the re-modulator 1218 may be coupled to the adjustment generator 1220. The subcarriers provided to the dual processor 1224 may also be provided to an input of the adjustment generator 1220. An output of the adjustment generator 1220 may be coupled to the adjustment block 1208 and adjustment block 1210. In this manner, the adjustment generator 1220 may provide an adjustment signal that may be utilized by both the adjustment block 1208 to process certain subcarriers used to generate output bits and the adjustment block 1210 used to process certain subcarriers used to generate the adjustment signal.

Examples of receivers described herein may be used in any of a variety of computing devices to receive wireless signals. Examples of receivers may be integrated into mobile devices (e.g., mobile terminals) such as, but not limited to, tablets, cell phones, smart phones, wearable devices, automobiles or other vehicles. Examples of receivers described herein may be integrated into any of a variety of computing or smart devices including but not limited to, routers, set-top boxes, video game systems, laptops, computers, and servers. Examples of receivers described herein may be integrated into any of a variety of wireless system infrastructure including, but not limited to, base stations, remote devices, mobile devices, or customer premise equipment.

Examples of receivers described herein may include one or more antennas, such as antenna 1202 and antenna 1204 of FIG. 12. Any number of antennas may be used including 1, 2, 3, 4, 3, 6, 7, 8, 9, 10, 16, 32, 64, 128, or another number of antennas. The antennas may receive incident radiation, generally including radiation at radio frequencies, and may provide one or more data streams. Data streams may include multiple subcarriers. A subcarrier, as described herein, may refer to a frequency for the duration of one symbol. In some examples a subcarrier may refer to a transform bin (e.g., an FFT bin) used in one or more modulation protocols. Multiple subcarriers may constitute a composite block that may consist of several subcarriers in frequency and one or more symbols in time. A composite block may consist of one or more resource blocks, each resource block consisting of several subcarriers in frequency and one or more symbols in time.

Data streams received by receivers described herein may include two types of subcarriers. Certain subcarriers of a composite block may be designated as payload subcarriers. The payload data may be encoded into a set of bits known as a transport block. Payload subcarriers may be modulated with transport block data which may be received, adjusted, demodulated and decoded to provide output bits. The output bits may correspond to data sent to the receiver by a transmitter (not shown in FIG. 12). Certain subcarriers may be designated as dual use subcarriers. Dual use subcarriers may be further divided into upper dual subcarriers and lower dual subcarriers. Upper dual subcarriers may be those payload subcarriers of a resource block that are both designated as payload and dual use subcarriers. Lower dual subcarriers may carry check bits associated with the upper dual subcarriers. The dual use subcarriers of a resource block may encode data corresponding to a few transport block bits associated with that resource block and may be processed as described herein to generate an adjustment signal. Any number of subcarriers may be used in a resource block. In some examples, a resource block may consist of 52 subcarriers by 1 symbol, 48 of which may be payload subcarriers, 8 may be dual subcarriers, and 4 may be both payload and upper dual subcarriers.

Examples of receivers described herein may accordingly include a demultiplexer, such as demux 1222 of FIG. 12. The demux 1222 may output payload subcarriers and dual use subcarriers. For example, the demux 1222 may separate the subcarriers by frequency and/or symbol. The demux 1222 may provide dual use subcarriers to one processing path (e.g., dual processor 1224 of FIG. 12), and may provide payload subcarriers to another processing path (e.g., stream processor 1206 of FIG. 12). The upper dual subcarriers, being payload subcarriers, may also be provided to the stream processor 1206. The demux 1222 may be implemented using one or more pre-selection filters; low-noise amplifiers; local oscillators; down-convertors; baseband filters; analog-to-digital convertors; and FPGAs, ASICs, or DSPs that implement cyclic prefix removal, fast Fourier transformation, beamforming, and subcarrier selection, or other components. The demux 1222 may be pre-arranged to separate subcarriers of predetermined frequency and/or symbol in some examples. The demux 1222 may be configurable to adjust the frequencies of the subcarriers and/or symbol designated as payload or dual use in some examples.

Examples of receivers described herein may include a stream processor, such as stream processor 1206 of FIG. 12. Stream processors described herein may be utilized to recover output bits. Any number of stream processors may be included, such as 1, 2, 3, 4, 5, 6, 7, 8, or another number of stream processors. Generally, each stream processor may operate on payload subcarriers from a data stream received by one or more of the antennas. A data stream generally refers to signals based on incident energy received at the receiver 1200 from a particular transmitter (e.g., from a particular location). The data stream may include signals from any number of antennas.

Examples of stream processors described herein may adjust subcarriers, demodulate adjusted subcarriers, and decode the demodulator output thereby producing output bits from data streams. Examples of stream processors may include an adjustment block, such as adjustment block 1208 of FIG. 12. The adjustment block may adjust a phase, amplitude, or both of the subcarriers provided to the stream processor. In this manner the adjustment block 1208 may output adjusted versions of the multiple subcarriers of data streams provided to the stream processor 1206. The adjustment provided by the adjustment block 1208 may generally serve to compensate for effects of the channel between the receiver 1200 and a transmitter used to transmit the signals corresponding to the data stream. Because the channel may change over time or the phase of the receiver's local oscillator may drift in phase relative to the transmitter's local oscillator, the adjustment applied by the adjustment block 1208 may also be desirably updated over time to more accurately compensate for effects of the channel changes or phase noise. The adjustment block may be implemented using, for example, one or more equalizers, one or more multipliers, one or more FPGAs, and/or other electronic components. For example, the adjustment block 1208 may be implemented using a multiplier (e.g., a complex multiplier) which may be used to apply a phase adjustment to multiple subcarriers input to the adjustment block 1208. In some examples, the adjustment block 1208 may be implemented using an equalizer which may be used to apply a phase and/or amplitude adjustment to the multiple subcarriers input to the adjustment block 1208.

Once adjusted, the adjusted subcarriers may be provided to a demodulator, such as demodulator 1211 of FIG. 12. The demodulator 1211 may convert the modulated subcarriers into log-likelihood ratio, LLR, samples. The decoder 1212 may decode the LLR samples to provide output bits. The adjuster, demodulator, and decoder of the stream processor may be executed once per transport block. In this manner, data may be received by the receiver. The output bits may be provided to other electronic components coupled to and/or integrated with the receiver 1200—including but not limited to, one or more displays, processors, or memories.

Examples of receivers described herein may include one or more dual processors, such as dual processor 1224 of FIG. 12. The dual processor 1224 may be used to generate signals used to provide the adjustment used by the adjustment block 1208 of the stream processor 1206. The dual processor 1224 may receive dual use subcarriers of resource blocks of data streams from the demux 1222. The lower dual use subcarriers may be modulated by pilot data (e.g., known data) or may be modulated by the check bits of the dual encoder. Upper dual subcarriers may be those payload subcarriers of a resource block that are both designated as payload and dual use subcarriers. The upper dual subcarriers may be provided by the demux 1222 to both the stream processor 1206 and the dual processor 1224. The dual processor 1224 may process the dual use subcarriers to obtain information about the channel (e.g., an estimate of the channel) or the difference in phase noise of the transmitter's and receiver's local oscillator.

The dual processor 1224 may include an adjustment block, such as adjustment block 1210. In an analogous manner to the adjustment block 1208 of stream processor 1206, the adjustment block 1210 may apply a phase adjustment, amplitude adjustment, or both to the dual use subcarriers. The adjustment provided by the adjustment block 1210 may wholly and/or partially compensate for variations imposed by a channel or phase noise described herein. Once adjusted, adjusted versions of the dual use subcarriers may be provided to demodulator 1214, whose output is processed by decoder 1216, then the re-modulator 1218 operates on the decoder output. The demodulator 1214 may demodulate the adjusted versions of the dual use subcarriers. The decoder 1216 may decode the demodulated adjusted versions of the dual use subcarriers. The re-modulator 1218 may re-modulate the decoded signals to provide re-modulated dual subcarriers. The dual processor 1224 and adjustment generator 1220 may be executed once per resource block thereby providing an adjustment for the current resource block entering the stream processor adjustment block 1208 and the next resource block entering the dual processor adjustment block 1210.

Examples of receivers described herein may include adjustment generators, such as adjustment generator 1220 of FIG. 12. The adjustment generator 1220 may provide adjustment signals used to control the adjustment blocks (e.g., adjustment block 1208 and adjustment block 1210 of FIG. 12) to compensate for channel changes described herein. The adjustment generator 1220 may receive the dual use subcarriers from the demux 1222. The adjustment generator 1220 may receive the dual use subcarriers before being processed by the adjustment block 1210 as shown in FIG. 12, or after being processed by the adjustment block 1210 in other examples. The adjustment generator 1220 may also receive the re-modulated dual subcarriers from the re-modulator 1218. Comparing the dual use subcarriers and the re-modulated dual subcarriers allows the adjustment generator 1220 to provide adjustment signals used to control the adjustment blocks. The adjustment generator 1220 may be implemented using a locked loop (e.g., a phase locked loop and/or an amplitude locked loop). The adjustment generator 1220 may be implemented using a channel estimator. Adjustment signals provided by the adjustment generator 1220 may include phase adjustment signals, amplitude adjustment signals, or both. In some examples the adjustment signals may control the adjustment blocks to provide a particular amount of adjustment. In some examples, the input to the adjustment generator 1220 comes from the output of the dual adjustment block 1210 and the adjustment signals may provide an update to a previous and/or present adjustment being made by the adjustment blocks.

Examples of adjustment generators described herein may include locked loops. Examples of locked loops include phase locked loops. In some examples, a locked loop may be used which performs phase and amplitude tracking. In some examples, a phase locked loop may be used. Examples of phase locked loops described herein may include multiple integrators—including an integrator in the product domain and another in the linear domain. The use of two integrators may be advantageous in some examples as described herein.

During operation of systems described herein, data may be encoded for transmission. Data may be encoded at one or more encoders included in one or more transmitters. Generally, transmitters may be coupled to and/or integrated with mobile devices, computing devices, and/or wireless infrastructure in an analogous manner to receivers as described herein.

During encoding, data bits may be encoded for a set of payload subcarriers to provide a payload code. The payload code may allow a receiver to recover a transport block in some examples. The payload code may allow a receiver to recover a code block (also referred herein as a transport block) for an LTE system in some examples. A few payload encoded bits corresponding to those that will be mapped to upper dual subcarriers of each resource block may be encoded using a dual code thereby producing systematic bits that may be mapped to the upper dual subcarriers and check bits that may be mapped to the lower dual subcarriers. The dual code may allow a receiver to recover the modulation on the dual subcarriers of each resource block. Both the payload subcarriers and the lower dual subcarriers may be transmitted over a channel to a receiver.

By encoding data bits for dual subcarriers in examples described herein, it may be possible to reduce the error in the channel estimate and thereby reduce the bit error rate or reduce the required transmit power. In some examples, this may be due to the number of dual use subcarriers being larger than a number of subcarriers needed to encode the pilot bits. For example, FIG. 1 shows 4 pilot subcarriers and FIG. 4 shows 8 dual use subcarriers.

During receiving, an adjustment (e.g., a phase adjustment) may be applied to payload subcarriers of received data streams to provide adjusted payload data streams. The adjusted payload data streams may be demodulated and decoded to recover payload bits (e.g., output bits). In some examples, dual use subcarriers may also be adjusted and decoded (e.g., using the same components).

Dual use subcarriers may be adjusted by a same adjustment used to adjust the payload subcarriers. The adjusted dual use subcarriers may be demodulated, decoded, and re-modulated to provide the phase adjustment and/or an update to the phase adjustment for the payload subcarriers, dual use subcarriers, or both.

In this manner, in contrast to other systems, receivers described herein may not utilize advance knowledge of the dual subcarrier modulation. Rather, the dual subcarriers may be demodulated, forward error corrected, and re-modulated (e.g., using the demodulator 1214, decoder 1216, and re-modulator 1218 of FIG. 12). In this manner, the modulation imposed on the dual subcarriers may be determined and utilized to decode data in the dual subcarriers (e.g., using the stream processor 1206). Accordingly, the dual demodulator, dual decoder, and dual re-modulator used in receivers described herein, such as those shown in FIG. 7, FIG. 11, and FIG. 12, may be used to replace a lookup table that may be present in other systems which store the pilot subcarrier modulation.

Accordingly, systems described herein may implement dual subcarrier techniques. Example wireless communication systems may utilize some payload subcarriers as dual subcarriers. Example wireless communication systems may protect such payload subcarriers both with a long payload code and dual subcarriers with a short dual code. Example wireless communication systems described herein may include receivers which may demodulate, decode, and re-modulate the dual subcarriers. In this manner, the number of subcarriers that are used by an adjustment generator (e.g., a PLL) to track a signal error (e.g., a phase and/or amplitude error) may be double that used by systems which do not utilize the dual subcarrier techniques described herein.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A receiver comprising:
at least one antenna configured to receive incident signals and provide at least one data stream, the data stream comprising multiple subcarriers;
a stream processor configured to operate on payload subcarriers of the multiple subcarriers, the stream processor configured to:
apply a phase adjustment to the payload subcarriers to provide adjusted versions of the payload subcarriers, demodulate the adjusted versions of the payload subcarriers to provide demodulated payload signals; and
decode bits from the demodulated payload signals;
a phase adjustor, demodulator, decoder, and re-modulator configured to operate on dual subcarriers of the multiple subcarriers to provide re-modulated dual subcarriers;
a locked loop configured to accept the re-modulated dual subcarriers, the locked loop configured to provide the phase adjustment or an update to the phase adjustment.

2. The receiver of claim 1, wherein a number of the multiple subcarriers is 52 and a number of the dual subcarriers is 8.

3. The receiver of claim 1, wherein the stream processor comprises a multiplier, an aggregator, a demodulator, and a decoder.

4. The receiver of claim 3, wherein the multiplier is configured to apply the phase adjustment to the multiple subcarriers.

5. The receiver of claim 1, wherein the stream processor comprises an equalizer, an aggregator, a demodulator, and a decoder.

6. The receiver of claim 5, wherein the equalizer is configured to apply the phase adjustment to the multiple subcarriers.

7. The receiver of claim 1, wherein the locked loop compares the dual subcarriers of the multiple subcarriers with the re-modulated dual subcarriers to compute the phase adjustment.

8. The receiver of claim 1, wherein the locked loop compares the adjusted dual subcarriers of the multiple subcarriers with the re-modulated dual subcarriers to compute the update to the phase adjustment.

9. The receiver of claim 1, wherein bits of the payload subcarriers are protected by a first code configured for use in recovering payload bits, the bits of the dual subcarriers are protected by a second code configured for use in generating the phase adjustment, and the systematic bits of the dual subcarriers are a subset of the payload bits.

10. The receiver of claim 1, wherein the locked loop is configured to perform phase and amplitude tracking.

11. The receiver of claim 1, wherein the locked loop comprises a phase locked loop, and the phase locked loop further comprises an integrator in a product domain and an integrator in a linear domain.

12. A method comprising:
encode data bits into transport block bits;
divide the transport block bits into one or more resource blocks; and
for each resource block:
modulate the bits of the resource block onto a first set of subcarriers designated as payload subcarriers;
select a subset of the bits of the resource block that are mapped to a subset of payload subcarriers, such subcarriers being designated as upper dual subcarriers;

encode said subset of bits thereby forming dual systematic bits and dual check bits;
modulate the dual check bits onto a second set of subcarriers designated as lower dual subcarriers;
a third set of subcarriers comprising the upper dual subcarriers and the lower dual subcarriers and designated as dual subcarriers and
transmit the payload subcarriers and the lower dual subcarriers.

13. The method of claim 12, further comprising receiving the transmitted subcarriers of each resource block and recovering the modulation on the dual subcarriers.

14. The method of claim 13, further comprising using the dual subcarriers to reduce the phase error of the payload subcarriers.

15. The method of claim 14, further comprising demodulating the phase error reduced payload subcarriers across the resource blocks and decoding the demodulated subcarriers thereby recovering the data bits.

16. A method comprising:
apply a phase adjustment to multiple payload subcarriers of first received data streams, demodulate, and decode to recover payload bits, and
adjust, demodulate, decode, and re-modulate, dual use subcarriers of second received data streams to generate the phase adjustment or an update to the phase adjustment.

17. The method of claim 16, further comprising receiving the first received data streams and the second received data streams at a mobile terminal.

18. A method of implementing a digital signal locked-loop comprising:
for each resource block:
performing a complex multiplication of a first set of one or more complex received samples by a rotation phasor thereby forming rotated dual samples;
performing a complex multiplication of a second set of one or more complex received samples by the rotation phasor thereby forming rotated payload samples;
comparing the rotated dual samples with ideal dual samples thereby forming a complex product domain error phasor;
subtracting 1 from the complex product domain error phasor thereby forming a linear domain error phasor;
passing the linear domain error phasor through a loop filter having an integrator thereby forming a linear phase correction sample;
adding 1 to the linear phase correction sample thereby forming a product domain phase sample; and
passing the product domain phase sample through a product domain integrator thereby forming the next rotation phasor.

19. The method of claim 18 wherein the product domain error phasor is further constrained to have unity amplitude.

20. The method of claim 19 wherein the loop filter incorporates two sets of loop coefficients, one set configured to operate on a real component of the linear domain error phasor, and another set configured to operate on an imaginary component of the linear domain error phasor.

* * * * *